(12) United States Patent
Matsuura et al.

(10) Patent No.: US 10,110,132 B2
(45) Date of Patent: Oct. 23, 2018

(54) SWITCHING POWER SUPPLY DEVICE

(71) Applicant: TDK CORPORATION, Tokyo (JP)

(72) Inventors: Ken Matsuura, Tokyo (JP); Min Lin, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/905,074

(22) Filed: Feb. 26, 2018

(65) Prior Publication Data
US 2018/0254707 A1    Sep. 6, 2018

(30) Foreign Application Priority Data

Mar. 1, 2017    (JP) .................................. 2017-038498

(51) Int. Cl.
*H02M 3/158*    (2006.01)

(52) U.S. Cl.
CPC .................................. *H02M 3/1584* (2013.01)

(58) Field of Classification Search
CPC ............................ H02M 3/1584; H02M 1/096
USPC .......................................................... 323/272
See application file for complete search history.

(56) References Cited

U.S. PATENT DOCUMENTS

| | | | | |
|---|---|---|---|---|
| 6,628,106 B1 * | 9/2003 | Batarseh | ............. | H02M 3/1584 323/222 |
| 2009/0327786 A1 * | 12/2009 | Carroll | ...................... | G06F 1/26 713/340 |
| 2015/0008890 A1 * | 1/2015 | Sasao | ...................... | H02M 1/08 323/271 |

FOREIGN PATENT DOCUMENTS

JP    2006-254669    9/2006

OTHER PUBLICATIONS

Pilawa-Podgurski et al., "Very-High-Frequency Resonant Boost Converters", IEEE Transactions on Power Electronics, vol. 24, No. 6, Jun. 2009, pp. 1654-1665.

* cited by examiner

*Primary Examiner* — Alex Torres-Rivera
(74) *Attorney, Agent, or Firm* — Greenblum & Bernstein, P.L.C.

(57) ABSTRACT

A switching power supply device generates a DC output voltage based on a DC input voltage, and includes n converter units and a control unit. The control unit executes first driving control that drives k1 (where 0≤k1<n) out of the n converter units when the DC output voltage has risen to an upper limit value of the reference voltage range and second driving control that drives k2 (where k1<k2≤n) out of the n converter units when the DC output voltage has fallen to a lower limit value of the reference voltage range. During the first driving control, if the DC output voltage Vo reaches a first value above the upper limit value, k1 and k2 are decreased by a value k0. During the second driving control, if the DC output voltage Vo reaches a second value below the lower limit value, k1 and k2 are increased by the value k0.

8 Claims, 10 Drawing Sheets

F I G. 1 0
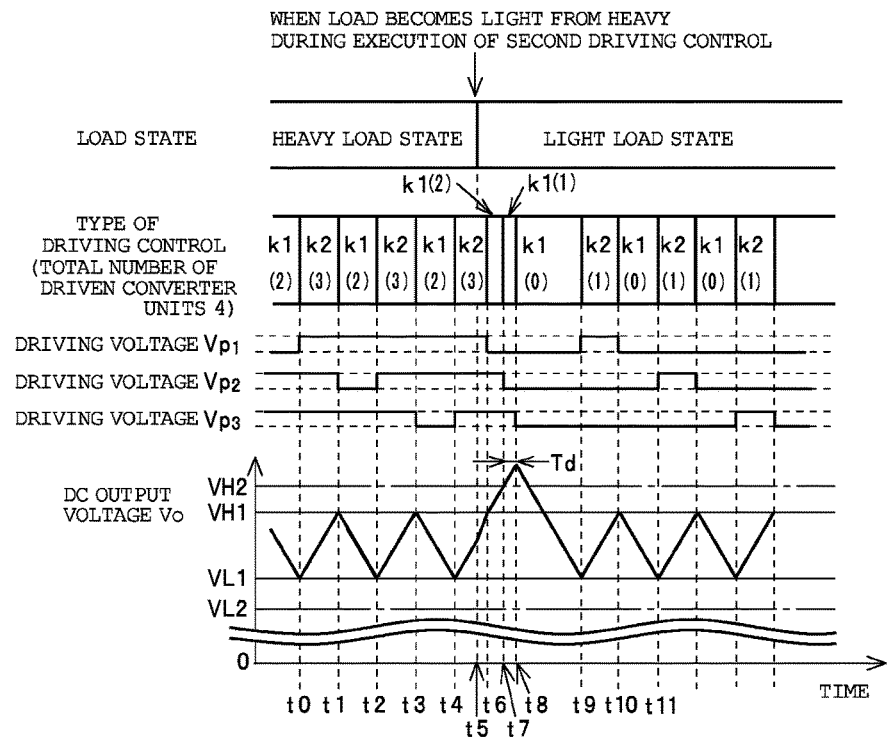
F I G. 1 1
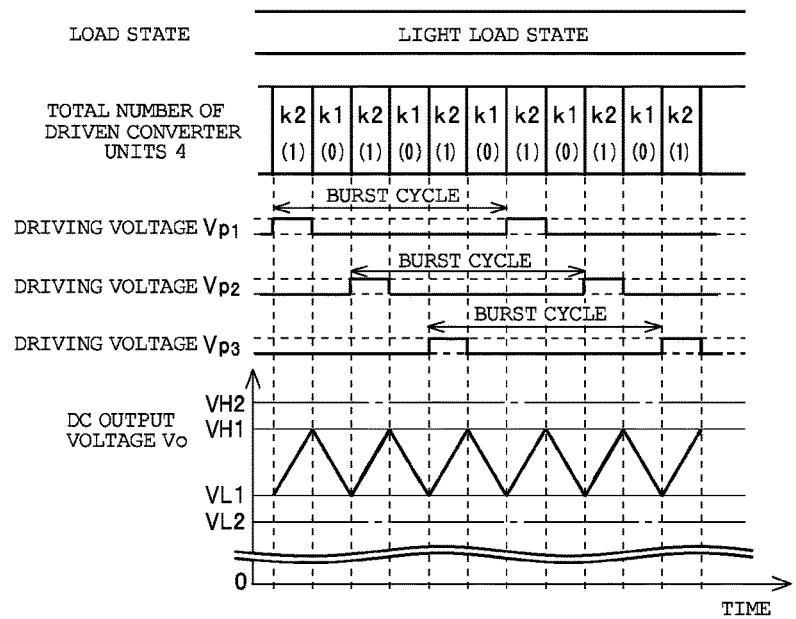

F I G. 1 2
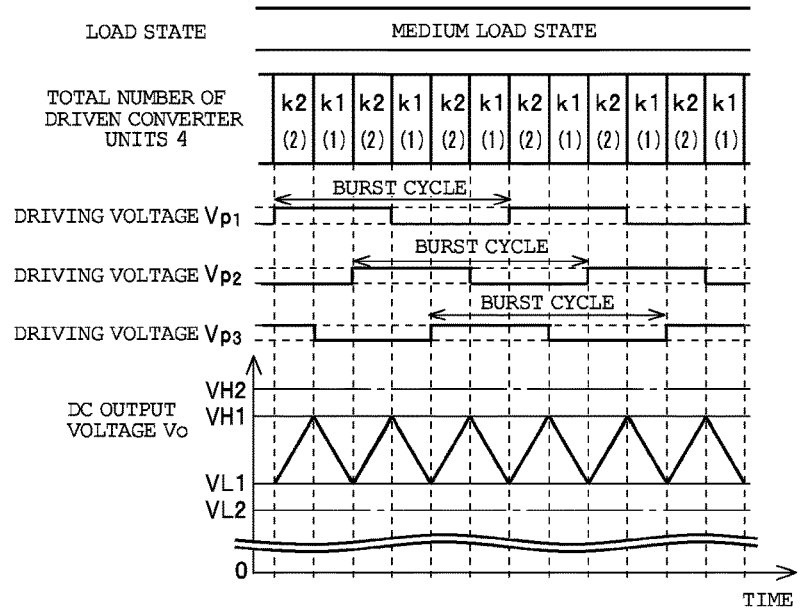
F I G. 1 3
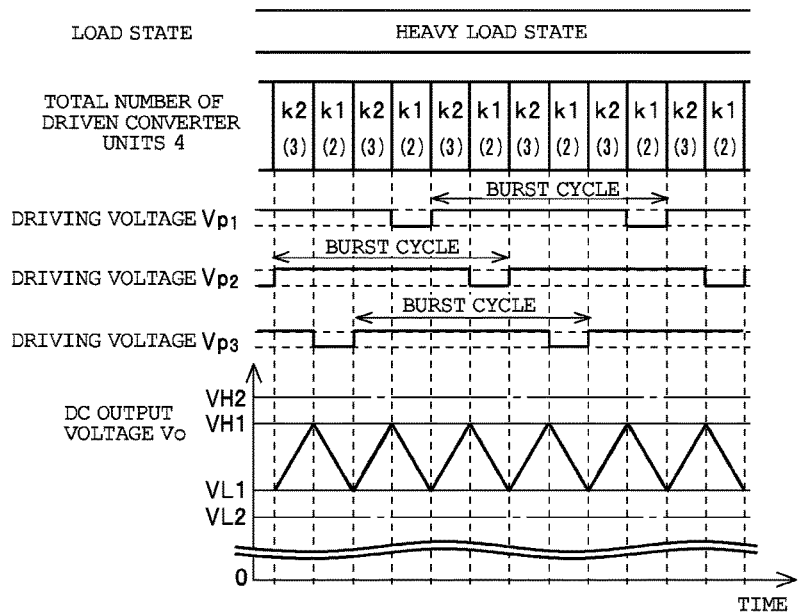

SWITCHING POWER SUPPLY DEVICE

FIELD OF THE INVENTION

The present invention relates to a switching power supply device equipped with a plurality of converter units that are interconnected in parallel.

DESCRIPTION OF THE RELATED ART

Due to recent improvements in the performance of power semiconductors and the commercialization of power semiconductors that use compound semiconductors such as GaN and SiC, it has become possible to raise the switching frequency of switching power supply devices, which enables switching power supply devices to be miniaturized and have higher power densities. However, when the power density of a switching power supply device is increased, parasitic inductance present in the wiring and elements becomes problematic. This makes it necessary to use elements, such as surface-mounted elements, that have low parasitic inductance and to mount elements in a compact arrangement to shorten the wiring between them. However, it is typically difficult to increase the output power capacities of individual surface-mounted elements, and even if the output power capacity of one element were increased, it would be difficult to dissipate heat due to the increase in power density.

For this reason, for a high-frequency/high power density switching power supply device, to avoid having elements that dissipate heat crowded together and make the temperature distribution uniform, it is effective to connect a plurality of converters in parallel (see Patent Literature 1 (hereinafter "PTL1") (Japanese Laid-open Patent Publication No. 2006-254669). When the input voltage of a switching power supply device is high, there is a problematic increase in the switching losses of switching elements as the switching frequency increases. To avoid this problem, it is possible to suppress the switching losses by soft switching the switching elements. Soft switching circuits, such as a Class-E converter circuit and a Class Φ2 converter, are known as circuits for soft switching the switching elements in this way (See Non-Patent Literature 1 (hereinafter "NPTL1")("Very-High-Frequency Resonant Boost Converters", IEEE Transactions on Power Electronics, Vol. 24, No. 6, June 2009, pp 1654-1665)).

NPTL1 indicated above discloses the use of burst control to control a Class-E converter circuit. Since controlling a Class-E converter circuit according to burst control makes it possible for a converter circuit to operate with a fixed time ratio and a fixed frequency, it is possible to easily satisfy the conditions for ZVS (zero volt switching) of a converter circuit. As a result, it is possible to convert power with high efficiency across a wide range of loads from a light load to a heavy load.

In more detail, a Class-E converter circuit that uses the burst control method disclosed in NPTL1 is composed of a hysteresis comparator, a high-frequency converter, and a high frequency gate driving circuit. In this Class-E converter circuit, the hysteresis comparator compares the output voltage of the high-frequency converter inputted into the minus input terminal and a reference voltage inputted into the plus input terminal (that is, a voltage that is automatically switched between a low-level reference voltage and a high-level reference voltage based on its own comparator output voltage) and sets the comparator output voltage at the high level when the output voltage inputted into the minus input terminal falls and reaches the reference voltage inputted into the plus input terminal (here, the low-level reference voltage). By doing so, the reference voltage inputted into the plus input terminal is switched from the low-level reference voltage to the high-level reference voltage. At the same time, the high-frequency gate driving circuit is activated and starts to drive the high-frequency converter. By doing so, the output voltage of the high-frequency converter rises and the output voltage inputted into the minus input terminal of the hysteresis comparator also rises.

After this, when the output voltage of the high-frequency converter inputted into the minus input terminal has reached the reference voltage (here, the high-level reference voltage) inputted into the plus input terminal, the hysteresis comparator sets the comparator output voltage at the low level. By doing so, the reference voltage inputted into the plus input terminal is switched from the high-level reference voltage to the low-level reference voltage. At the same time, the driving of the high-frequency converter by the high-frequency gate driving circuit stops. By doing so, the output voltage of the high-frequency converter falls, and the output voltage inputted into the minus input terminal of the hysteresis comparator also falls. In this way, with this Class-E converter circuit, due to the hysteresis comparator, the high-frequency converter, and the high-frequency gate driving circuit repeating the above operation, it is possible to control the output voltage from the high-frequency converter between the low-level reference voltage and the high-level reference voltage.

SUMMARY OF THE INVENTION

With the Class-E converter circuit disclosed in NPTL1, when parallel operation is used to increase the output voltage and improve reliability, during a period where a plurality of Class-E converter circuits connected in parallel operate with a fixed time ratio and a fixed frequency, to have the Class-E converter circuit output a substantially fixed current irrespective of the output voltage, a current balancing circuit such as that disclosed in PTL1 mentioned above is unnecessary.

However, when a plurality of Class-E converter circuits have been simply connected in parallel, since the timing at which the output voltage reaches the reference voltage (the high-level reference voltage or the low-level reference voltage) is the same time for the hysteresis comparators of the Class-E converter circuits, transitions from a driving period to a stopped period in a burst and transitions from a stopped period to a burst driving period are performed simultaneously by the respective Class-E converter circuits. That is, the frequency of ripples in the output voltage produced due to such bursts matches the burst frequency that is the repeating frequency of the driving periods and stopped periods of the Class-E comparator circuits (more specifically, the high-frequency converters of the Class-E comparator circuits).

As one example, for a case where two Class-E comparator circuits of the same configuration are simply connected in parallel and supply power to a common load, as depicted in FIG. 19, since the timing at which the output voltage Vo reaches the reference voltage (a high-level reference voltage VH or a low-level reference voltage VL) at the hysteresis comparator of each Class-E comparator circuit is the same, the driving period and the stopped period in a burst by each Class-E comparator circuit are at the same time. That is, the repeating cycle for the driving period and the stopped period (i.e., the "burst cycle") matches the cycle of ripples in the output voltage Vo (that is, the burst frequency and the frequency of ripples match).

Accordingly, with a switching power supply device of this configuration which performs control over a plurality of Class-E converter circuits connected in parallel so as to simply switch between the driving period and the stopped period in a burst at the same time, to reduce the hysteresis of the hysteresis comparators and make the ripples in the output voltage smaller in order to miniaturize the device and reduce the output capacitance, it is necessary to increase the frequency of the ripples. To do so, it becomes necessary to raise the burst frequency of the Class-E converter circuits. Due to this, in a switching power supply device that uses this configuration (i.e., a configuration where the driving period and stopped period in a burst are simply switched simultaneously for a plurality of Class-E converter circuits that are connected in parallel), there is an increase in the number of times each Class-E converter circuit is driven and stopped per unit time. Since the proportion of the period where there is stable operation with a fixed time ratio and fixed frequency falls, there is the problem of a drop in efficiency.

The present invention was conceived in view of the problem described above and has a principal object of providing a switching power supply device that is capable of improved efficiency while having a plurality of converter units connected in parallel to increase the output power.

To achieve the stated object, a switching power supply device according to the present invention comprises n (where n is an integer of two or higher) converter units that are connected in parallel between a direct current (DC) input unit and a DC output unit; and a control unit that executes driving control over the n converter units, wherein the switching power supply device generates a DC output voltage based on a DC input voltage inputted from the DC input unit and outputs the DC output voltage from the DC output unit to a load, the switching power supply device further comprises a voltage comparator unit that compares the DC output voltage with a reference voltage range set in advance, a first voltage value that is higher than an upper limit value of the reference voltage range and a second voltage value that is lower than a lower limit value of the reference voltage range, and outputs a comparison result to the control unit, the control unit is configured to be capable of executing first driving control that drives k1 (where k1 is an integer set so that 0≤k1<n) converter units out of the n converter units and second driving control that drives k2 (where k2 is an integer set so that k1<k2≤n) converter units out of the n converter units, the control unit executes the first driving control when, in an execution state of the second driving control, the comparison result indicating that the DC output voltage has risen and reached the upper limit value of the reference voltage range has been acquired, the control unit executes the second driving control when, in an execution state of the first driving control, the comparison result indicating that the DC output voltage has fallen and reached the lower limit value of the reference voltage range has been acquired, the control unit decreases, when the comparison result indicating that the DC output voltage has risen and reached the first voltage value has been acquired in the execution state of the first driving control, k1 by a value k0 set in advance (where k0 is an integer that is one or greater but below k1) to produce a new k1 for the first driving control, continues the first driving control, and decreases k2 by the value k0 to produce a new k2 for the second driving control, and the control unit increases, when the comparison result indicating that the DC output voltage has fallen and reached the second voltage value has been acquired in the execution state of the second driving control, k2 by the value k0 to produce a new k2 for the second driving control, continues the second driving control, and increases k1 by the value k0 to produce a new k1 for the first driving control.

In this way, the control unit repeatedly executes the first driving control and the second driving control over the converter units while adjusting the output power by increasing and decreasing the driven number of converter units. By doing so, compared to a conventional switching power supply device that performs driving control that simultaneously drives all of the converter units and driving control that simultaneously stops all of the converter units in all of the load states, it is possible, while maintaining the output power in the heavy load state, to reduce the number of converter units subjected to driving control in a lighter load state, which makes it possible to improve efficiency.

In the switching power supply device according to the present invention, n is an integer that is 3 or higher, and the control unit further decreases, when the comparison result indicating that the DC output voltage is above the first voltage value is continuously acquired for a certain period in a continued state of the first driving control after the comparison result indicating that the DC output voltage has risen and reached the first voltage value was acquired, k1 by the value k0 to produce a new k1 for the first driving control, continues the first driving control, and further decreases k2 by the value k0 to produce a new k2 for the second driving control, and the control unit further increases, when the comparison result indicating that the DC output voltage is below the second voltage value is continuously acquired for a certain period in a continued state of the second driving control after the comparison result indicating that the DC output voltage has fallen and reached the second voltage value was acquired, k2 by the value k0 to produce a new k2 for the second driving control, continues the second driving control, and further increases k1 by the value k0 to produce a new k1 for the first driving control.

By doing so, it is possible to smoothly transition to the steady-state operation in the changed-to load state, even when there is a big change in the load state. As a result, it is possible to reliably control the variations (or "ripples") in the DC output voltage Vo to within the reference voltage range.

In the switching power supply device according to the present invention, during a steady-state operation, in which the load is in a constant state and the first driving control executed when the comparison result indicating that the DC output voltage has risen and reached the upper limit value of the reference voltage range has been acquired in the execution state of the second driving control and the second driving control executed when the comparison result indicating that the DC output voltage has fallen and reached the lower limit value of the reference voltage range has been acquired in the execution state of the first driving control are repeated, the control unit drives the n converter units so as to balance utilization ratios of the n converter units.

By doing so, it is possible to reduce the load for individual converter units, so that it is possible to use small heat sinks.

In the switching power supply device according to the present invention, when executing the first driving control and the second driving control, the control unit drives the converter units by burst control.

By doing so, when each converter unit is constructed as a resonant converter, since it is possible to drive (switch) the respective converter units in driving periods with a fixed time ratio and a fixed frequency that are capable of reliably satisfying the conditions for zero volt switching, it is possible to reliably improve the efficiency of each converter unit.

It should be noted that the disclosure of the present invention relates to the contents of Japanese Patent Application No. 2017-038498 that was filed on Mar. 1, 2017, the entire contents of which are herein incorporated by reference.

BRIEF DESCRIPTION OF THE DRAWINGS

These and other objects and features of the present invention will be explained in more detail below with reference to the attached drawings, wherein:

FIG. 10 is another diagram useful in explaining an operation of the switching power supply device 1 when there is a change from the heavy load state to the light load state;

FIG. 11 is a diagram useful in explaining a steady-state operation in the light load state of the switching power supply device 1;

FIG. 12 is a diagram useful in explaining a steady-state operation in the medium load state of the switching power supply device 1;

FIG. 13 is a diagram useful in explaining a steady-state operation in the heavy load state of the switching power supply device 1;

DESCRIPTION OF THE PREFERRED EMBODIMENTS

Preferred embodiments of a switching power supply device will now be described with reference to the attached drawings.

Figure 1:
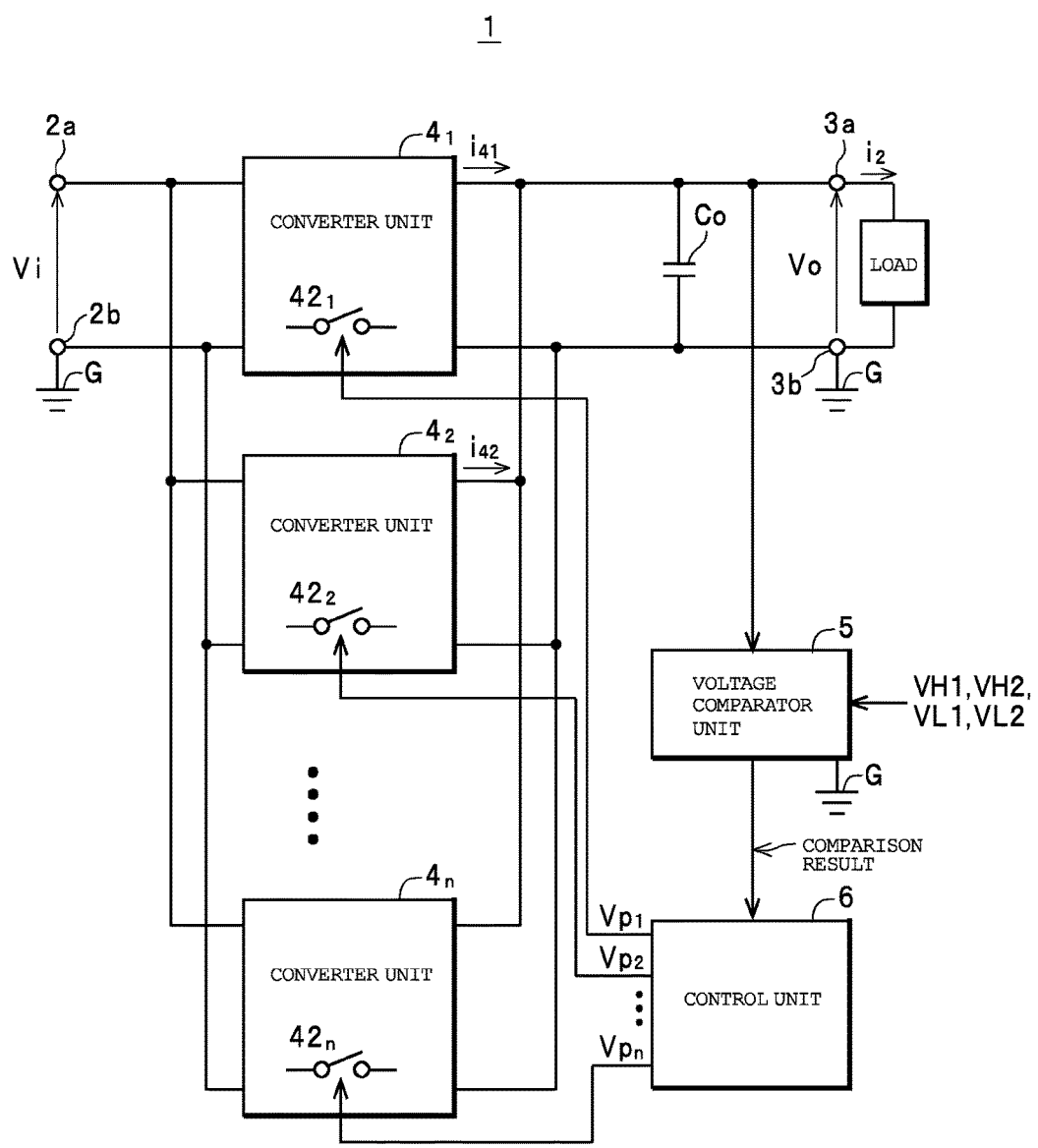
FIG. 1 is a block diagram depicting the configuration of a switching power supply device 1.

As depicted in FIG. 1, a switching power supply device 1 as one example of a "switching power supply device" is equipped with a pair of direct current (DC) input terminals 2a and 2b as a "DC input unit", a pair of DC output terminals 3a and 3b as a "DC output unit", a plurality (n, where n is an integer of two or higher) of converter units $4_1, 4_2, \ldots, 4_n$ that are connected in parallel between the pair of DC input terminals 2a and 2b and the pair of DC output terminals 3a and 3b, a voltage comparator unit 5, and a control unit 6, and is configured to be capable of generating a DC output voltage Vo based on a DC input voltage Vi inputted across the DC input terminals 2a and 2b and outputting the DC output voltage Vo from the DC output terminals 3a and 3b to a load. Note that as one example in the present embodiment, the DC input voltage Vi is inputted across the DC input terminals 2a and 2b with the DC input terminal 2b connected to a reference potential (in the present embodiment, a common ground G) as the low potential side. In addition in the present embodiment, since the DC output terminal 3b out of the DC output terminals 3a and 3b is also connected to the common ground G and the switching power supply device 1 as a whole is configured as a non-isolated converter device, the DC output voltage Vo is outputted from the DC output terminals 3a and 3b with the DC output terminal 3b as the low potential side.

The converter units $4_1, 4_2, \ldots, 4_n$ (hereinafter referred to as the "converter units 4" when no particular distinction is made between them) have the same configuration (as one example, resonant converters of the same configuration). The converter unit $4_1$ will now be described as one example of the configuration of the converter units 4.

Figure 2:
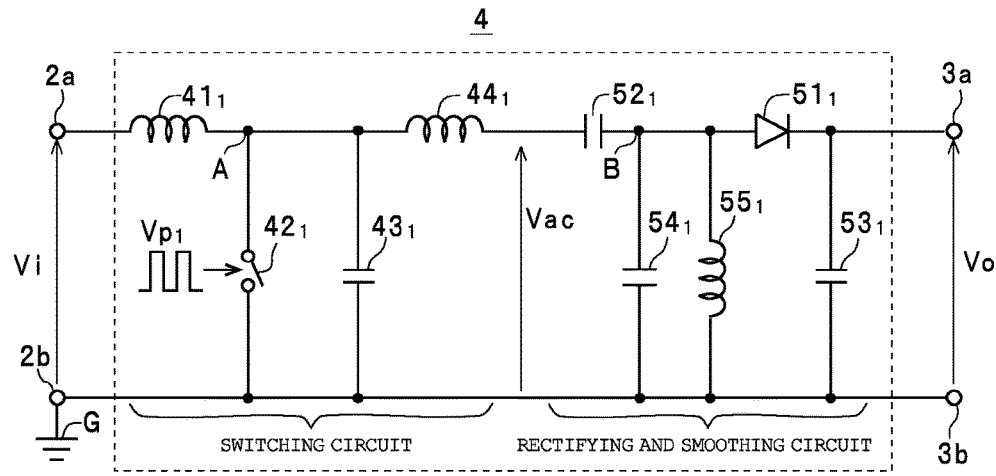
FIG. 2 is a circuit diagram depicting an example circuit of a converter unit 4.

In more detail, as depicted in FIG. 2, the converter unit $4_1$ is equipped with a switching circuit and a rectifying and smoothing circuit. As one example, the switching circuit is equipped with a series circuit composed of a first inductor $41_1$ and a switching element $42_1$, a first resonant capacitor $43_1$ connected in parallel to the switching element $42_1$, and a second resonant inductor $44_1$ that is connected at one end to a junction (or "first junction A") between the first inductor $41_1$ and the switching element $42_1$. In the switching circuit, a series circuit composed of the first inductor $41_1$ and the switching element $42_1$ is connected across the pair of DC input terminals 2a and 2b, a series circuit composed of the first inductor $41_1$ and the second resonant inductor $44_1$ is connected to one DC input terminal out of the pair of DC input terminals 2a and 2b (in this example, to the DC input terminal 2a), and a terminal, out of the pair of terminals of the switching element $42_1$, that is not connected to the first junction A is connected to the other DC input terminal out of the pair of DC input terminals 2a and 2b (in this example, to the DC input terminal 2b). Note that it is assumed that the output capacitance (not illustrated) of the switching element $42_1$ is included in the first resonant capacitor $43_1$. The switching element $42_1$ is composed of a field effect transistor such as a MOSFET (Metal-Oxide-Semiconductor Field-Effect Transistor), a bipolar transistor, a GaN (gallium nitride) device, or the like.

By driving the switching element $42_1$ using a corresponding driving voltage Vp (in this example, the driving voltage $Vp_1$) out of driving voltages $Vp_1$, $Vp_2$, $Vp_n$ (hereinafter referred to as the "driving voltage Vp" when no particular distinction is made between them), described later, supplied from the control unit 6, the switching circuit with the above configuration that is constructed as a Class-E converter circuit is capable of converting the DC input voltage Vi inputted across the DC input terminals 2a and 2b to an AC output voltage Vac and outputting across the other terminal of the second resonant inductor $44_1$ and the DC input terminal 2b (the common ground G).

As one example, the rectifying and smoothing circuit is equipped with a series circuit composed of a second resonant capacitor $52_1$ and a third resonant capacitor $54_1$, a third resonant inductor $55_1$ connected in parallel to the third resonant capacitor $54_1$, a diode $51_1$ connected between a junction (the "second junction B") between the second resonant capacitor $52_1$ and the third resonant capacitor $54_1$ and the DC output terminals 3a and 3b (in the present example, the DC output terminal 3b), and a smoothing capacitor $53_1$ connected between the DC output terminals 3a and 3b, and is configured as a resonant rectifying and smoothing circuit. More specifically, a series circuit composed of the second resonant capacitor 52 and the third resonant capacitor 54 is connected between the other end of the second resonant inductor $44_1$ and the DC input terminal 2b (the common ground G). Also, a series circuit composed of the second resonant capacitor 52 and the diode 51 is connected between the other end of the second resonant inductor $44_1$ and the DC output terminal 3a.

The rectifying and smoothing circuit with the configuration described above is capable of converting the AC output voltage Vac outputted from the switching circuit to the DC output voltage Vo and outputting to the DC output terminals 3a and 3b. Note that the smoothing capacitors $53_1$, $53_2$, ..., $53_n$ (note that the smoothing capacitors $53_2$, ..., $53_n$ aside from the smoothing capacitor $53_1$ are omitted from the drawings) included in the rectifying and smoothing circuits of the converter units $4_1$, $4_2$, ..., $4_n$ are connected to each other in parallel. For this reason, in the following description, a configuration where one output capacitor Co with a capacitance that is equal to the combined parallel capacitance of the smoothing capacitors $53_1$, $53_2$, ..., $53_n$ is connected between the DC output terminals 3a and 3b as depicted in FIG. 1 is described.

The voltage comparator unit 5 includes a hysteresis comparator, for example, and while detecting the DC output voltage Vo, compares the DC output voltage Vo with a reference voltage range that is set in advance (i.e., a voltage range defined by an upper limit value VH1 and a lower limit value VL1) and a first voltage value VH2 that is set in advance and a second voltage value VL2 that is set in advance, and outputs a comparison result to the control unit 6. The first voltage value VH2 is set at a voltage value that is higher than the upper limit value VH1 of the reference voltage range and the second voltage value VL2 is set at a voltage value that is lower than the lower limit value VL1 of the reference voltage range. It is also possible to configure the voltage comparator unit 5 so as to be equipped with a hysteresis comparator and other circuitry (a CPU or the like) that outputs information depicting the comparison result described above based on the output of the hysteresis comparator. It is also possible to configure the voltage comparator unit 5 of a CPU, a DSP, an FPGA, or the like without using a hysteresis comparator.

The control unit 6 executes driving control over the respective n converter units $4_1$, $4_2$, ..., $4_n$ by generating n driving voltages $Vp_1$, $Vp_2$, ..., $Vp_n$ that one-to-one correspond with the n converter units $4_1$, $4_2$, ..., $4_n$ and outputting the driving voltages $Vp_1$, $Vp_2$, ..., $Vp_n$ to the switching elements $42_1$, $42_2$, ..., $42_n$ of the converter units $4_1$, $4_2$, ..., $4_n$. Here, as depicted in FIG. 3 for example, the control unit 6 executes first driving control that drives k1 converter units out of the n converter units 4 (where k1 is an integer that is equal to or above zero but less than n) and second driving control that drives k2 converter units out of the n converter units 4 (where k2 is an integer that is greater than k1 but less than n).

More specifically, as depicted in FIGS. 3 to 15, when the load state is constant (i.e., constant in a heavy load state, constant in a medium load state, and constant in a light load state), the control unit 6 executes a steady-state operation that controls the DC output voltage Vo to be within the reference voltage range by repeating an operation of executing, when a comparison result indicating that the DC output voltage Vo has risen and reached the upper limit value VH1 of the reference voltage range has been acquired from the voltage comparator unit 5 during an execution state of the second driving control that drives k2 converter units 4, the first driving control that drives k1 converter units 4 in place of the second driving control and an operation of executing, when a comparison result indicating that the DC output voltage Vo has fallen and reached the lower limit value VL1 of the reference voltage range has been acquired from the voltage comparator unit 5 during an execution state of the first driving control, the second driving control. That is, in the steady-state operation, the control unit 6 controls the DC output voltage Vo so that the maximum value of ripples (variations) is the upper limit value VH1 of the reference voltage range and the minimum value of the ripples is the lower limit value VL1 of the reference voltage range.

Figure 3:
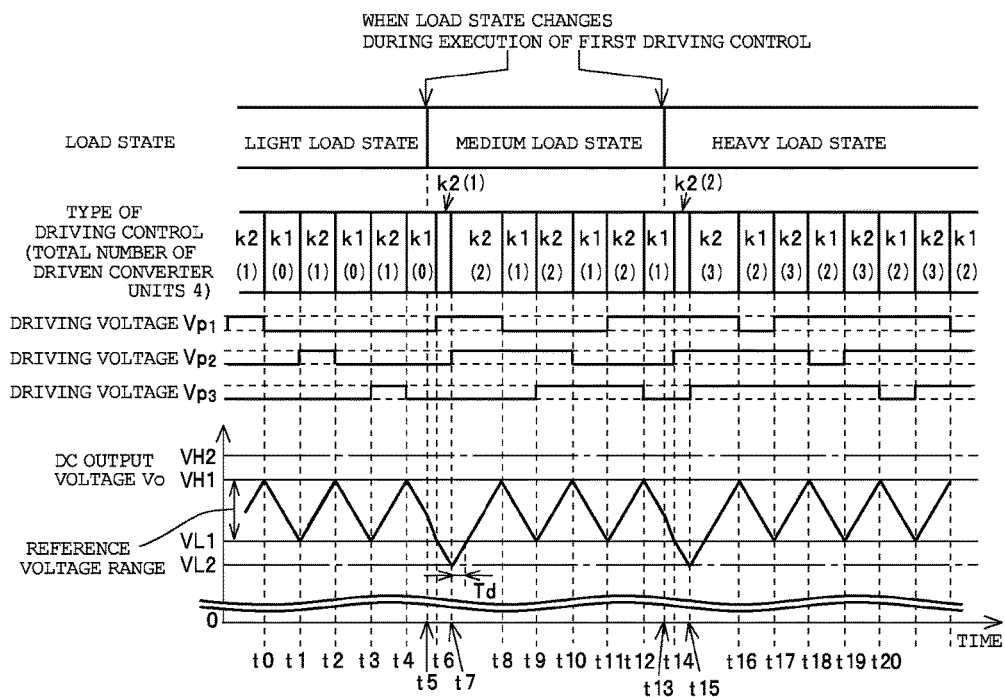
FIG. 3 is a diagram useful in explaining an operation of the switching power supply device 1 in a light load state, a medium load state, and a heavy load state.
Figure 4:
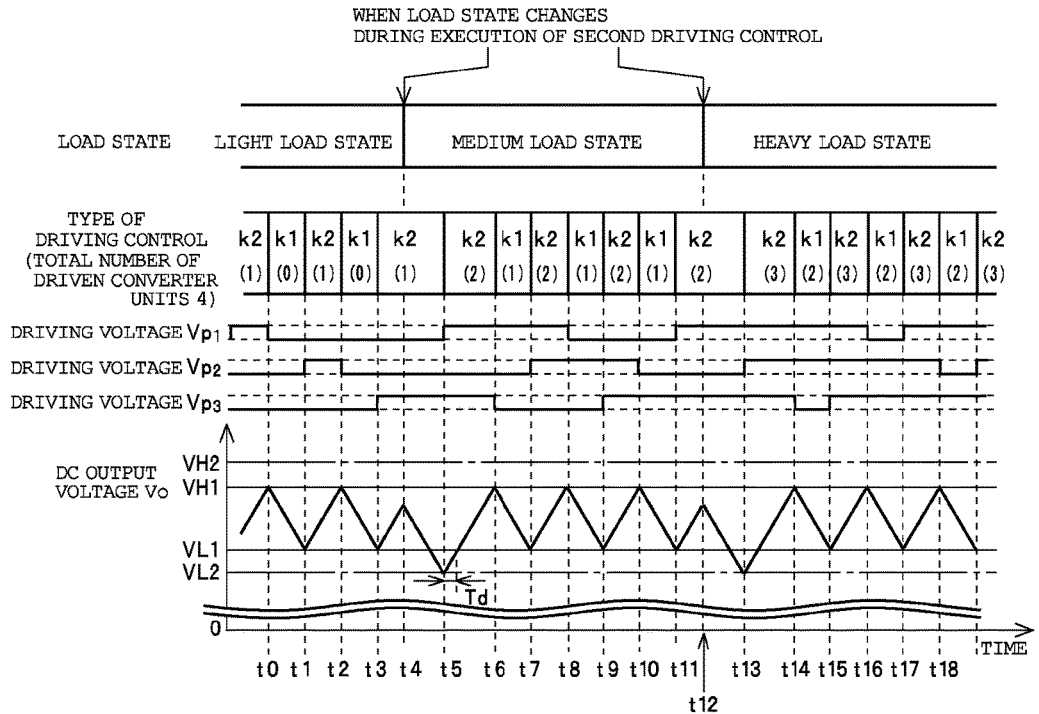
FIG. 4 is another diagram useful in explaining an operation of the switching power supply device 1 in the light load state, the medium load state, and the heavy load state.
Figure 5:
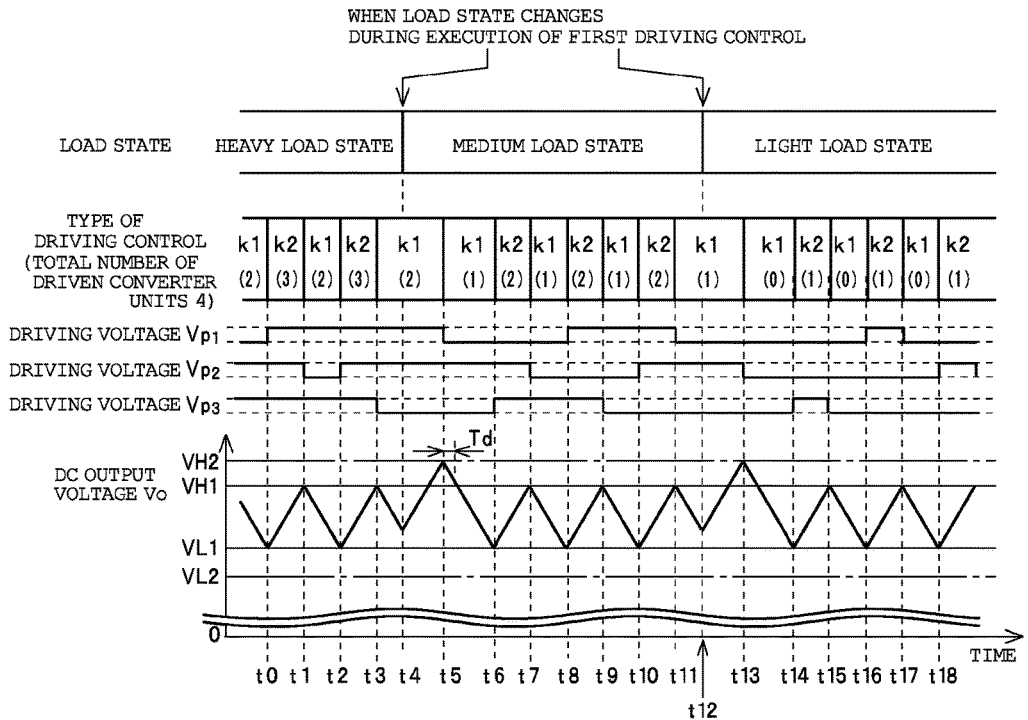
FIG. 5 is another diagram useful in explaining an operation of the switching power supply device 1 in the light load state, the medium load state, and the heavy load state.
Figure 6:
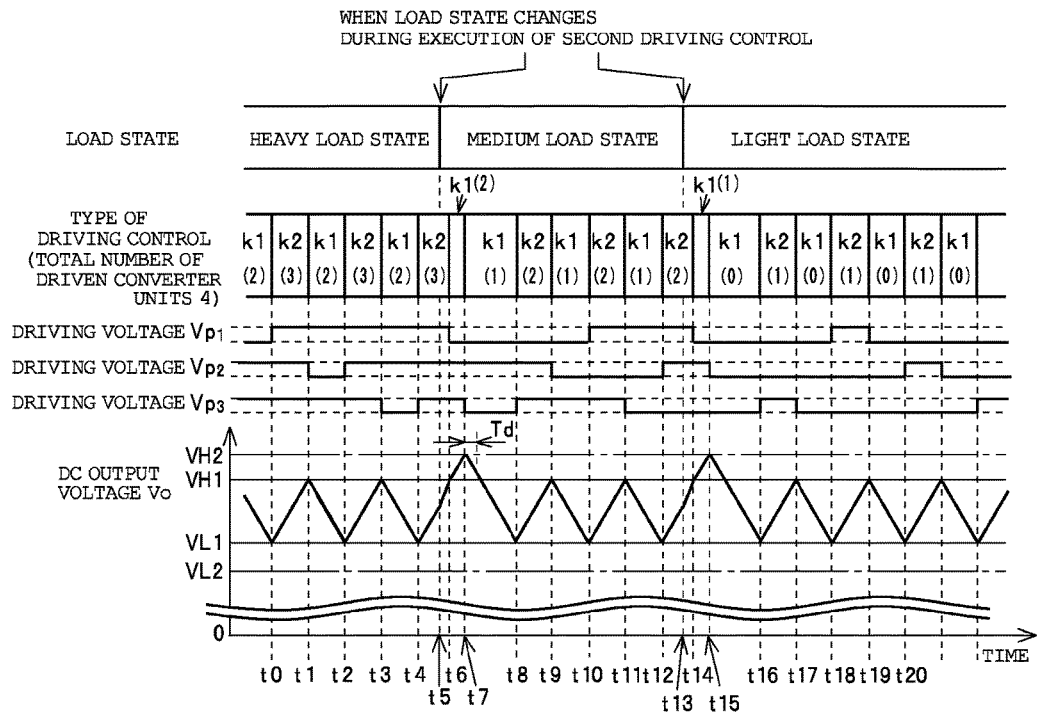
FIG. 6 is another diagram useful in explaining an operation of the switching power supply device 1 in the light load state, the medium load state, and the heavy load state.

Also, as depicted in FIGS. 3 and 4, on acquiring, during an execution state of the second driving control, a comparison result indicating that the DC output voltage Vo has fallen and reached the second voltage value VL2 from the voltage comparator unit 5, the control unit 6 increases the number k2 by the value k0 (an integer that is equal to or greater than 1 but lower than k1, as one example in the present embodiment, k0=1), continues the second driving control with the new number k2 (that is, k2←k2+k0), and also increases the value k1 by the value k0(=1) to produce a new value k1 (that is, k1←k1+k0) for the first driving control. Similarly, as depicted in FIGS. 5 and 6, on acquiring, during an execution state of the first driving control, a comparison result indicating that the DC output voltage Vo has risen and reached the first voltage value VH2 from the voltage comparator unit 5, the control unit 6 decreases the current value k1 by the value k0(=1), continues the first driving control with the new value k1 (that is, k1←k1−k0), and also decreases the number k2 by the value k0(=1) to produce a new number k2 (that is, k2←k2−k0) for the second driving control.

Figure 7:
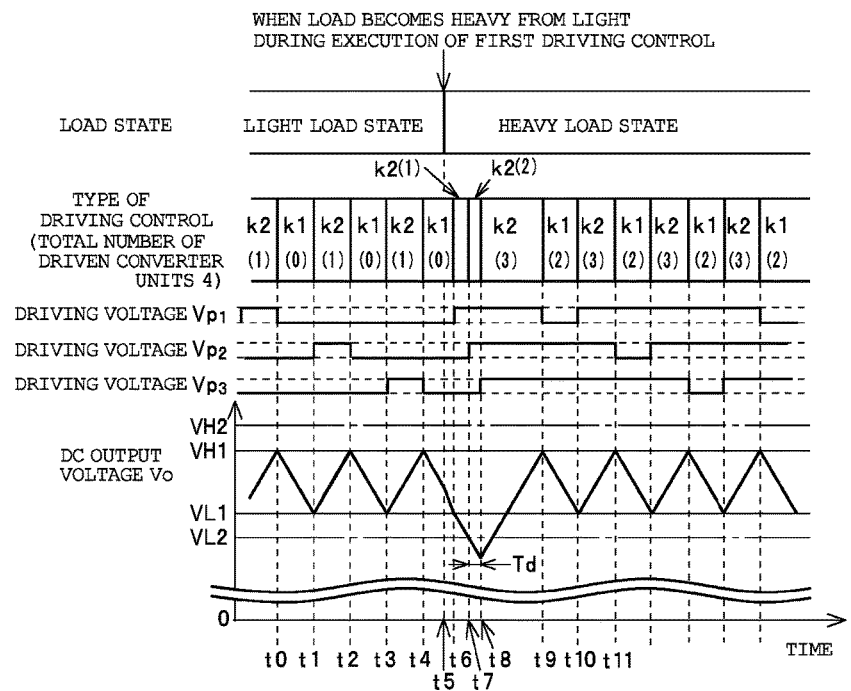
FIG. 7 is a diagram useful in explaining an operation of the switching power supply device 1 when there is a change from the light load state to the heavy load state.
Figure 8:
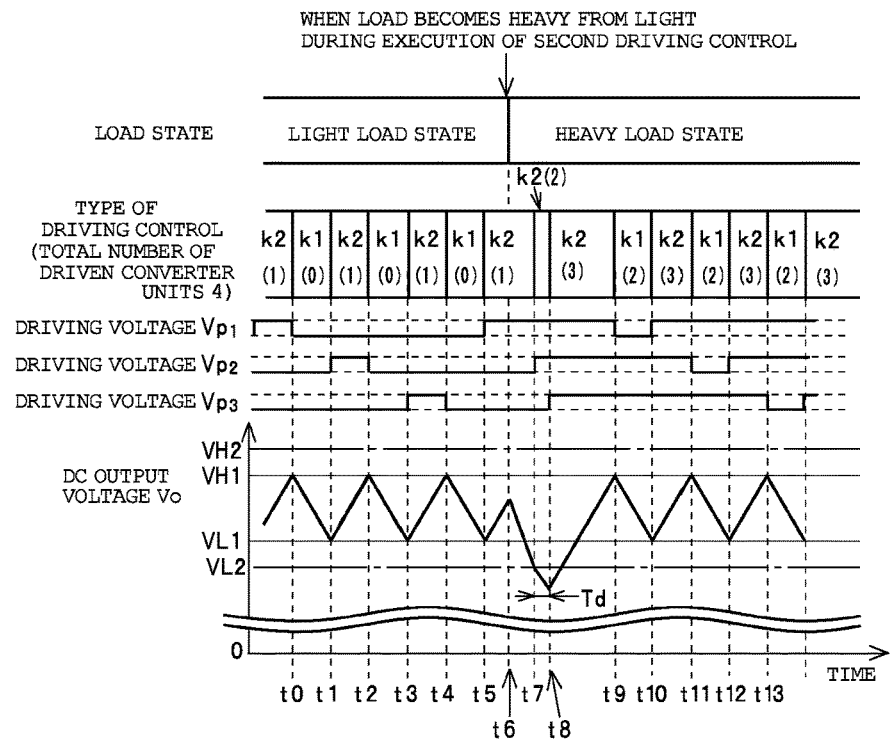
FIG. 8 is another diagram useful in explaining an operation of the switching power supply device 1 when there is a change from the light load state to the heavy load state.
Figure 9:
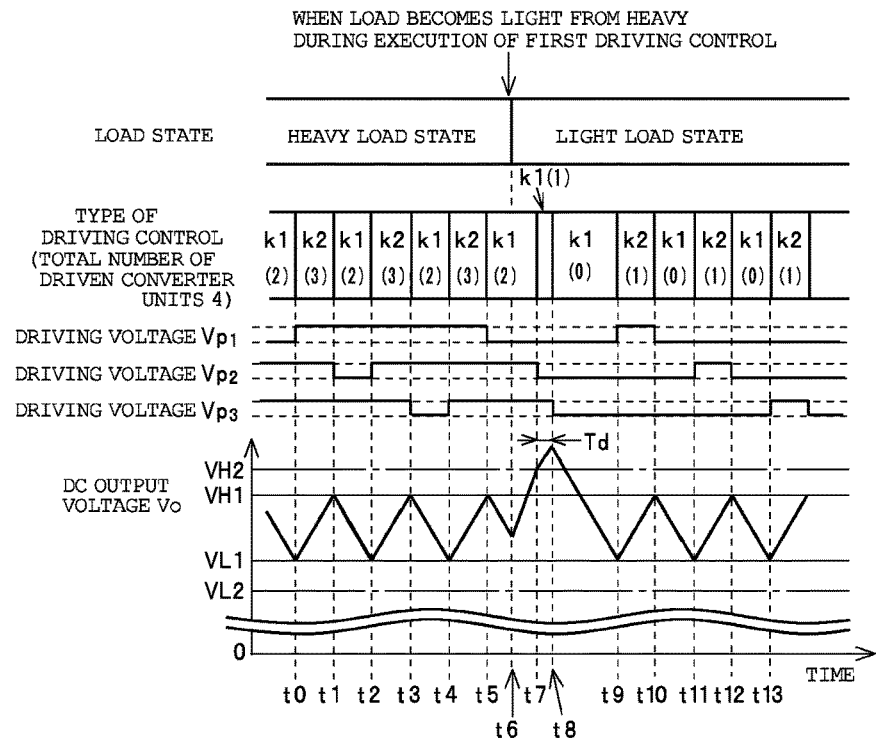
FIG. 9 is a diagram useful in explaining an operation of the switching power supply device 1 when there is a change from the heavy load state to the light load state.

As depicted in FIGS. 7 and 8, when, in a state where the second driving control has continued (hereinafter "continued state") after a comparison result indicating that the DC output voltage Vo has fallen and reached the second voltage value VL2 was acquired from the voltage comparator unit 5, a comparison result indicating that the DC output voltage Vo is below the second voltage value VL2 has been acquired from the voltage comparator unit 5 continuously for a certain period Td, the control unit 6 further increases the number k2 by the value k0 to produce a new k2 (that is, k2←k2+k0) for the second driving control, continues the second driving control with the new number k2, and further increases the value k1 by the value k0 to produce a new value k1 (that is, k1←k1+k0) for the first driving control. Also, as depicted in FIGS. 9 and 10, when, in a continued state of the first driving control after a comparison result indicating that the DC output voltage Vo has risen and reached the first voltage value VH2 was acquired from the voltage comparator unit 5, a comparison result indicating that the DC output voltage Vo is above the first voltage value VH2 has been acquired from the voltage comparator unit 5 continuously for the certain period Td, the control unit 6 further decreases the value k1 by the value k0(=1) to produce a new k1 for the first driving control (that is, k1←k1−k0), continues the first driving control with the new value k1, and further decreases the number k2 by the value k0 to produce a new number k2 (that is, k2←k2−k0) for the second driving control.

By doing so, when the load state has changed so as to decrease as depicted in FIGS. 3 to 6 (that is, when there is a change between the heavy load state and the medium load state, and when there is a change between the medium load state and the light load state) and when the load state has greatly changed as depicted in FIGS. 7 to 10 (that is, when there is a change between the heavy load state and the light load state), the number k1 of converter units 4 driven in the first driving control is changed to a new number k1 corresponding to the changed-to load state from the previous number k1 that corresponds to the pre-change load state, the number k2 of converter units 4 driven in the second driving control is changed to a new number k2 corresponding to the changed-to load state from the previous number k2 that corresponds to the pre-change load state, and the same driving control is executed in the changed-to load state as when the state described above where the load is constant, thereby controlling the DC output voltage Vo so as to be within the range of the reference voltage.

The control unit 6 generates the driving voltages Vp outputted to each converter unit 4 in each driving control out of the first driving control and the second driving control described above in a state that includes a plurality of switching pulses with a fixed time ratio and a fixed frequency that are set in advance so that the converter units 4 that have the same configuration perform a zero volt switching operation. By doing so, the respective converter units 4 are driven in bursts by the driving voltages Vp.

As one example, the control unit 6 that operates as described above includes an oscillator for generating switching pulses, n gate circuits into which the switching pulses are inputted and which are capable of enable control (gate circuits provided so as to one-to-one correspond to the n converter units 4), and a sequential circuit or a CPU that decides what driving control out of the first driving control and the second driving control is to be executed by the respective converter units 4 based on the comparison result from the voltage comparator unit 5, enables the gate circuits corresponding to the converter units 4 to be driven for only the driving period to output the switching pulses as the driving voltages Vp, and disables gate circuits corresponding to the converter units 4 to be stopped to stop the outputting of the driving voltages Vp.

Next, the steady-state operation of the switching power supply device 1 in a light load state, the steady-state operation in a medium load state, the steady-state operation in the heavy load state, the operation when the load state has changed so as to decrease (a change between the light load state and the medium load state and a change between the medium load state and the heavy load state) will be described with reference to FIGS. 3 to 6 and FIGS. 11 to 13. For ease of understanding the operation, the number n of converter units 4 is set at 3. Accordingly, in this example, the control unit 6 is assumed to generate and output three driving voltages $Vp_1$, $Vp_2$, and $Vp_3$ that one-to-one correspond to the three converter units $4_1$, $4_2$, and $4_3$. Also, in the heavy load state, it is assumed that the total of the currents outputted from three converter units 4 is larger than the current to be supplied to the load in this state and that the total of the currents outputted from two converter units 4 is smaller than the current to be supplied to the load in this state. In the medium load state, it is assumed that the total of the currents outputted from two converter units 4 is larger than the current to be supplied to the load in this state and that the current outputted from one converter unit 4 is smaller than the current to be supplied to the load in this state. In the light load state, it is assumed that the current outputted from one converter unit 4 is larger than the current to be supplied to the load in this state.

First, steady-state operation of the switching power supply device 1 in the light load state, the operation when there is a change from the light load state to the medium load state, steady-state operation in the medium load state, the operation when there is a change from the medium load state to the heavy load state, and steady-state operation in the heavy load state will be described with reference to FIG. 3.

First, the steady-state operation in the light load state during a period from time t0 to time t4 will be described. Note that it is assumed that immediately before time t0, the control unit 6 was executing the second driving control (i.e., control that sets the number of converter units 4 subject to driving control at k2(=1)) over the converter units 4. Here, as described above, the current outputted from one converter unit 4 is larger than the current to be supplied to the load in the light load state. This means that in the period immediately before time t0, the output capacitor Co is charged by a current that is the difference between the current outputted from one converter unit 4 and the current to be supplied to the load in the light load state, which causes the DC output voltage Vo to rise as depicted in FIG. 3.

After this, at time t0, when the DC output voltage Vo that has risen reaches the upper limit value VH1 of the reference voltage range, the voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control, which sets the number of converter units 4 to be driven at k1 (=0), in place of the second driving control described above from time to. Here, since all of the converter units 4 enter a stopped state, current is supplied to the load by discharging of the output capacitor Co, resulting in the DC output voltage Vo falling from the upper limit value VH1.

After this, at time t1, when the DC output voltage Vo that has fallen reaches the lower limit value VL1 of the reference voltage range, the voltage comparator unit 5 detects this and outputs a comparison result indicating that the DC output voltage Vo has fallen and reached the lower limit value VL1 of the reference voltage range to the control unit 6. The control unit 6 acquires this comparison result in the execution state of the first driving control and executes the second driving control described above in place of the first driving control described above from time t1. Here, since the current outputted from one converter unit 4 is larger than the current to be supplied to the load in the light load state, the output capacitor Co is charged by a current that is the difference between these currents, which causes the DC output voltage Vo to rise from the lower limit value VL1.

After this, at time t2, when the DC output voltage Vo that has risen reaches the upper limit value VH1 of the reference voltage range, the voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control described above in place of the second driving control described above from time t2. Here, since all of the converter units 4 enter a stopped state, current is supplied to the load by discharging of the output capacitor Co, resulting in the DC output voltage Vo falling from the upper limit value VH1.

In the period from time t0 to time t4 where the light load state continues, by executing the steady-state operation in the light load state that repeats the operation from time t0 to time t2 described above (i.e., by repeating the first driving control described above that sets the number of converter units 4 to be driven at k1(=0) and the second driving control described above that sets the number of converter units 4 to be driven at k2(=1) over the converter units 4), the control unit 6 controls the DC output voltage Vo to be within the reference voltage range. Also, during steady-state operation in the light load state (a state where the load is constant), to balance the utilization rates of the three converter units $4_1$, $4_2$, and $4_3$, as depicted in FIG. 3 (in more detail, as depicted in FIG. 11), the control unit 6 generates the three driving voltages $Vp_1$, $Vp_2$, and $Vp_3$ in a state where the voltages have the same frequencies (burst frequencies) and same time ratios but are respectively shifted by a predetermined period (one third of the burst cycle) and outputs the voltages to drive the three converter units $4_1$, $4_2$, and $4_3$. By doing so, as depicted in FIG. 11, the burst cycles of individual converter units 4 are n times (since n=3, 3 times in the present embodiment) the repeating cycle of the first driving control and the second driving control (which is the cycle of ripples in the DC output voltage Vo).

Next, the operation of the switching power supply device 1 when the load switches from the light load state to the medium load state and the medium load state continues thereafter will be described. As one example, as depicted in FIG. 3, assume that the load changes from the light load state to the medium load state at time t5 when the switching power supply device 1 is executing the steady-state operation in the light load state described above (in this example, during an execution state of the first driving control that sets the number of converter units 4 to be driven at k1(=0)). Here, since all of the converter units 4 are in the stopped state and a larger current is supplied to the load by discharging of the output capacitor Co, the DC output voltage Vo falls more rapidly.

After this, at time t6, when the DC output voltage Vo that has fallen reaches the lower limit value VL1 of the reference voltage range, the voltage comparator unit 5 detects this and outputs a comparison result indicating that the DC output voltage Vo has fallen and reached the lower limit value VL1 of the reference voltage range to the control unit 6. The control unit 6 acquires this comparison result in the execution state of the first driving control and executes the second driving control, which sets the number of converter units 4 to be driven at k2(=1), in place of the first driving control described above from time t6. However, as described above, the current outputted from one converter unit 4 is smaller than the current to be supplied to the load in the medium load state (that is, the current to be outputted from one converter unit 4 alone is insufficient as the current to be supplied to the load in the medium load state). Since this insufficiency is covered by discharging of the output capacitor Co, the DC output voltage Vo falls further from the lower limit value VL1.

After this, at time t7, when the DC output voltage Vo that has fallen reaches the second voltage value VL2, the voltage comparator unit 5 detects this and outputs a comparison result indicating that the DC output voltage Vo has fallen and reached the second voltage value VL2 to the control unit 6. The control unit 6 acquires this comparison result in the execution state of the second driving control, increases the present number k2(=1) of converter units 4 being driven in the second driving control by the value k0(=1) to produce a new number k2(=2(=k2+k0)), and continues the second driving control with the new number k2. The control unit 6 also increases the present number k1(=0) of converter units 4 to be driven in the first driving control by the value k0(=1) to produce a new number k1(=1(=k1+k0)). When the continuation of the second driving control with this new number k2(=2) has started, the control unit 6 determines whether there is leeway for further increasing the number k2 (i.e., whether k2<n), and when it has been determined that there is leeway (i.e., that k2 does not equal n), acquires, at a time that is a certain period Td (for example, several milliseconds) set in advance after the start time of the continued control (in this example, time t7), the comparison result outputted from the voltage comparator unit 5 and executes, based on the acquired comparison result, a first determination process that determines whether to change the number k1 used in the first driving control and the number k2 used in the second driving control. Here in this example, since there is leeway for further increasing the number k2 (the number k2 is two, which is lower than n=3), the control unit 6 executes the first determination process.

In the continued state of the second driving control where the number k2 of converter units 4 to be driven in the medium load state is set at 2, as described above, the total of the currents outputted from two converter units 4 is larger than the current to be supplied to the load in the medium load state. For this reason, the output capacitor Co is charged by a current that is the difference between the total of the currents outputted from the two converter units 4 and the current to be supplied to the load in the medium load state, which causes the DC output voltage Vo to rise from the second voltage value VL2 as depicted in FIG. 3. Here in this example, in the first determination process described above, the control unit 6 acquires a comparison result indicating that the DC output voltage Vo is above the second voltage value VL2 from the voltage comparator unit 5 at a time when the certain period Td described above has elapsed (i.e., before time t8 is reached). For this reason, the control unit 6 determines that in the continued state of the second driving control after the comparison result indicating that the DC output voltage Vo has fallen and reached the second voltage value VL2 was acquired, the state where the DC output voltage Vo is below the second voltage value VL2 did not continue for the certain period Td. Accordingly, at the time when the certain period Td has passed, the control unit 6 determines to not further change the number k1 used in the first driving control and the number k2 used in the second driving control.

After this, the DC output voltage Vo increases beyond the lower limit value VL1 of the reference voltage range and reaches the upper limit value VH1 of the reference voltage range at time t8. The voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control, which sets the number k1 of converter units 4 to be driven at 1, in place of the second driving control, which sets the number k2 of converter units 4 to be driven at 2, from time t8. Here, as described above, since the current outputted from one converter unit 4 is smaller than the current to be supplied to the load in the medium load state, the current outputted from one converter unit 4 is insufficient as the current to be supplied to the load in the medium load state. Since this insufficiency is covered by discharging of the output capacitor Co, the DC output voltage Vo falls from the upper limit value VH1.

After this, at time t9, when the DC output voltage Vo that has fallen reaches the lower limit value VL1 of the reference voltage range, the voltage comparator unit 5 detects this and outputs a comparison result indicating that the DC output voltage Vo has fallen and reached the lower limit value VL1 to the control unit 6. The control unit 6 acquires this comparison result in the execution state of the first driving control and executes the second driving control described above in place of the first driving control from time t9. Here, since the total of the currents outputted from two converter units 4 in the execution state of the second driving control is larger than the current to be supplied to the load in the medium load state, the output capacitor Co is charged by a current that is the difference between these currents, which causes the DC output voltage Vo to rise from the lower limit value VL1.

After this, at time t10, when the DC output voltage Vo that has risen reaches the upper limit value VH1 of the reference voltage range, the voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control described above in place of the second driving control described above from time t10. Here, the current outputted from one converter unit 4 alone is insufficient as the current to be supplied to the load in the medium load state. Since this insufficiency is covered by discharging of the output capacitor Co, the DC output voltage Vo falls from the upper limit value VH1.

In the period from time t8 to time t12 where the medium load state continues, by executing the steady-state operation in the medium load state that repeats the operation from time t8 to time t10 described above (i.e., by repeating the first driving control that sets the number of converter units 4 to be driven at k1(=1) and the second driving control that sets the number of converter units 4 to be driven at k2(=2) over the converter units 4), the control unit 6 controls the DC output voltage Vo to be within the reference voltage range. Also, during steady-state operation in the medium load state (a state where the load is constant), to balance the utilization rates of the three converter units $4_1$, $4_2$, and $4_3$, as depicted in FIG. 3 (in more detail, as depicted in FIG. 12), the control unit 6 generates the three driving voltages $Vp_1$, $Vp_2$, and $Vp_3$ in a state where the voltages have the same frequencies (burst frequencies) and same time ratios but are respectively shifted by a predetermined period (one third of the burst cycle) and outputs the voltages to drive the three converter units $4_1$, $4_2$, and $4_3$. By doing so, as depicted in FIG. 12, the burst cycles of an individual converter units 4 are n times (since n=3, 3 times in the present embodiment) the repeating cycle of the first driving control and the second driving control (which is the cycle of ripples in the DC output voltage Vo).

Next, the operation of the switching power supply device 1 when the load switches from the medium load state to the heavy load state and the heavy load state continues thereafter will be described. As one example, as depicted in FIG. 3, assume that the load changes from the medium load state to the heavy load state at time t13 when the switching power supply device 1 is executing the steady-state operation in the medium load state described above (in this example, during an execution state of the first driving control that sets the number of driven converter units 4 at k1(=1)). Here, since the current outputted from one converter unit 4 alone is insufficient as the current to be supplied to the load in the medium load state, this current is even more insufficient as the current to be supplied to the load in the heavy load state. For this reason, since a larger current is supplied to the load y discharging of the output capacitor Co, the DC output voltage Vo falls more rapidly.

After this, at time t14, when the DC output voltage Vo that has fallen reaches the lower limit value VL1 of the reference voltage range, the voltage comparator unit 5 detects this and outputs a comparison result indicating that the DC output voltage Vo has fallen and reached the lower limit value VL1 of the reference voltage range to the control unit 6. The control unit 6 acquires this comparison result in the execution state of the first driving control and executes the second driving control, which sets the number of converter units 4 to be driven at k2(=2), in place of the first driving control described above from time t14. However, as described above, the total of the currents outputted from two converter units 4 is smaller than the current to be supplied to the load in the heavy load state (that is, the currents outputted from two converter units 4 are insufficient as the current to be supplied to the load in the heavy load state). Since this insufficiency is covered by discharging of the output capacitor Co, the DC output voltage Vo falls further from the lower limit value VL1.

After this, at time t15, when the DC output voltage Vo that has fallen reaches the second voltage value VL2, the voltage comparator unit 5 detects this and outputs a comparison result indicating that the DC output voltage Vo has fallen and reached the second voltage value VL2 to the control unit 6. The control unit 6 acquires this comparison result in the execution state of the second driving control, increases the present number k2(=2) of converter units 4 being driven in the second driving control by the value k0(=1) to produce a new number k2(=3(=k2+k0)), and continues the second driving control with the new number k2. The control unit 6 also increases the present number k1(=1) of converter units 4 to be driven in the first driving control by the value k0(=1) to produce a new number k1(=2(=k1+k0)). When the continuation of the second driving control with the new number k2(=3) has started, the control unit 6 determines whether there is leeway for further increasing the number k2 (i.e., whether k2<n), and when it has been determined that there is leeway, executes the first determination process described above. Here, since k2 is 3 and there is no leeway for further increasing the number k2 (i.e., the number k2 is not lower than n), the control unit 6 does not execute the first determination process.

In the continued state of the second driving control where the number k2 of converter units 4 to be driven in the heavy load state is set at 3, as described above, the total of the currents outputted from three converter units 4 is larger than the current to be supplied to the load in the heavy load state. For this reason, the output capacitor Co is charged by a current that is the difference between the total of the currents outputted from the three converter units 4 and the current to be supplied to the load in the heavy load state, which causes the DC output voltage Vo to rise from the second voltage value VL2 as depicted in FIG. 3.

After this, the DC output voltage Vo increases beyond the lower limit value VL1 of the reference voltage range and reaches the upper limit value VH1 of the reference voltage range at time t16. The voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control, which sets the number k1 of converter units 4 to be driven at 2, in place of the second driving control, which sets the number k2 of converter units 4 to be driven at 3, from time t16. Here, as described above, since the total of the currents outputted from two converter units 4 is smaller than the current to be supplied to the load in the heavy load state, the currents outputted from two converter units 4 alone are insufficient as the current to be supplied to the load in the heavy load state. Since this insufficiency is covered by discharging of the output capacitor Co, the DC output voltage Vo falls from the upper limit value VH1.

After this, at time t17, when the DC output voltage Vo that has fallen reaches the lower limit value VL1 of the reference voltage range, the voltage comparator unit 5 detects this and outputs a comparison result indicating that the DC output voltage Vo has fallen and reached the lower limit value VL1 of the reference voltage range to the control unit 6. The control unit 6 acquires this comparison result in the execution state of the first driving control and executes the second driving control described above in place of the first driving control from time t17. Here, since the total of the currents outputted from three converter units 4 driven in the execution state of the second driving control is larger than the current to be supplied to the load in the heavy load state, the output capacitor Co is charged by a current that is the difference between these currents, which causes the DC output voltage Vo to rise from the lower limit value VL1.

After this, at time t18, when the DC output voltage Vo that has risen reaches the upper limit value VH1 of the reference voltage range, the voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control described above in place of the second driving control described above from time t18. Here, the total of the currents outputted from two converter units 4 alone is insufficient as the current to be supplied to the load in the heavy load state. Since this insufficiency is covered by discharging of the output capacitor Co, the DC output voltage Vo falls from the upper limit value VH1.

In the period from time t16 onward where the heavy load state continues, by executing the steady-state operation in the heavy load state that repeats the operation from time t16 to time t18 described above (i.e., by repeating the first driving control that sets the number of converter units 4 to be driven at k1(=2) and the second driving control that sets the number of converter units 4 to be driven at k2(=3) over the converter units 4), the control unit 6 controls the DC output voltage Vo to be within the reference voltage range. Also, during steady-state operation in the heavy load state (a state where the load is constant), to balance the utilization rates of the three converter units 41, 42, and 43, as depicted in FIG. 3 (in more detail, as depicted in FIG. 13), the control unit 6 generates the three driving voltages $Vp_1$, $Vp_2$, and $Vp_3$ in a state where the voltages have the same frequencies and same time ratios but are shifted by a predetermined period (one third of the burst cycle) and outputs the voltages to drive the three converter units $4_1$, $4_2$, and $4_3$. By doing so, as depicted in FIG. 13, the burst cycles of individual converter units 4 are n times (since n=3, 3 times in the present embodiment) the repeating cycle of the first driving control and the second driving control (which is the cycle of ripples in the DC output voltage Vo).

Note that although examples have been described where the load changes from the light load state to the medium load state and from the medium load state to the heavy load state where the first driving control in the steady-state operation during the light load state or the medium load state is being executed by the control unit 6, as depicted in FIG. 4, there are also cases where the load changes from the light load state to the medium load state and from the medium load state to the heavy load state where the second driving control in the steady-state operation during the light load state or the medium load state is being executed by the control unit 6.

The operation of the switching power supply device 1 in such cases will now be described with reference to FIG. 4. Note that since the steady-state operation in the light load state, the steady-state operation in the medium load state, and the steady-state operation in the heavy load state are the same as the steady-state operations in the light load state, the medium load state, and the heavy load state described above with reference to FIG. 3, description thereof is omitted, and the operation when the load changes from the light load state to the medium load state and from the medium load state to the heavy load state will be described.

As one example, as depicted in FIG. 4, when the load changes to the medium load state at time t4 where the second driving control in the steady-state operation in the light load state is being executed, since the medium load state is entered in a state where only one converter unit 4 is being driven, the current is insufficient as the current to be supplied to the load in the medium load state. Since this insufficiency is covered by discharging of the output capacitor Co, the DC output voltage Vo falls from the voltage value at time t4 (a voltage value that is above the lower limit value VL1 but is below the upper limit value VH1).

After this, the DC output voltage Vo falls further after reaching the lower limit value VL1 of the reference voltage range and then when the DC output voltage Vo that has fallen reaches the second voltage value VL2 at time t5, the voltage comparator unit 5 detects this and outputs a comparison result indicating that the DC output voltage Vo has fallen and reached the second voltage value VL2 to the control unit 6. The control unit 6 acquires this comparison result in the execution state of the second driving control, increases the present number k2(=1) of converter units 4 being driven in the second driving control by the value k0(=1) to produce a new number k2(=2(=k2+k0)), and continues the second driving control with the new number k2. The control unit 6 also increases the present number k1(=0) of converter units 4 to be driven in the first driving control by the value k0(=1) to produce a new number k1(=1(=k1+k0)). When the continuation of the second driving control with the new number k2(=2) has started, the control unit 6 determines whether there is leeway for further increasing the number k2 (i.e., whether k2<n), and on determining that there is leeway, executes the first determination process described above. Here in this example, since there is leeway for further increasing the number k2 (the number k2 is two, which is lower than n=3), the control unit 6 executes the first determination process.

In the continued state of the second driving control where the number k2 of converter units 4 to be driven in the medium load state is set at 2, as described above, the total of the currents outputted from two converter units 4 is larger than the current to be supplied to the load in the medium load state. For this reason, the output capacitor Co is charged by a current that is the difference between the current outputted from the two converter units 4 and the current to be supplied to the load in the medium load state, which causes the DC output voltage Vo to rise from the second voltage value VL2 as depicted in FIG. 4. Here, in the first determination process described above, the control unit 6 acquires a comparison result indicating that the DC output voltage Vo is above the second voltage value VL2 from the voltage comparator unit 5 at a time when the certain period Td described above has passed (i.e., before time t6 is reached). For this reason the control unit 6 determines that in the continued state of the second driving control after the comparison result indicating that the DC output voltage Vo has fallen and reached the second voltage value VL2, the state where the DC output voltage Vo is below the second voltage value VL2 did not continue for the certain period Td. Accordingly, at the time when the certain period Td has passed, the control unit 6 determines to not further change the number k1 used in the first driving control and the number k2 used in the second driving control.

After this, the DC output voltage Vo increases beyond the lower limit value VL1 of the reference voltage range and reaches the upper limit value VH1 of the reference voltage range at time t6. From time t6 until time t11, in the switching power supply device 1, the control unit 6 executes the steady-state operation in the medium load state to control the DC output voltage Vo to be within the reference voltage range.

As another example, when as depicted in FIG. 4, the load changes to the heavy load state at time t12 when the second driving control in the steady-state operation in the medium load state is being executed, since the heavy load state is entered in a state where only two converter units 4 are being driven, the current is insufficient as the current to be supplied to the load in the heavy load state. Since this insufficiency is covered by discharging of the output capacitor Co, the DC output voltage Vo falls from the voltage value at time t12 (a voltage value that is above the lower limit value VL1 but is below the upper limit value VH1).

After this, the DC output voltage Vo falls further after reaching the lower limit value VL1 of the reference voltage range and then when the DC output voltage Vo that has fallen reaches the second voltage value VL2 at time t13, the voltage comparator unit 5 detects this and outputs a comparison result indicating that the DC output voltage Vo has fallen and reached the second voltage value VL2 to the control unit 6. The control unit 6 acquires this comparison result in the execution state of the second driving control, increases the present number k2(=2) of converter units 4 being driven in the second driving control by the value k0(=1) to produce a new number k2(=3(=k2+k0)), and continues the second driving control with the new number k2. The control unit 6 also increases the present number k1(=1) of converter units 4 to be driven in the first driving control by the value k0(=1) to produce a new number k1(=2(=k1+k0)). When the continuation of the second driving control with the new number k2(=3) has started, the control unit 6 determines whether there is leeway for further increasing the number k2 (i.e., whether k2<n), and on determining that there is leeway for further increasing the number k2, executes the first determination process described above. Here in this example, since there is no leeway for further increasing the number k2 (i.e., the number k2 is not lower than n), the control unit 6 does not execute the first determination process.

In the continued state of the second driving control where the number k2 of converter units 4 to be driven in the heavy load state is set at 3, as described above, the total of the currents outputted from three converter units 4 is larger than the current to be supplied to the load in the heavy load state. For this reason, the output capacitor Co is charged by a current that is the difference between the current outputted from the three converter units 4 and the current to be supplied to the load in the heavy load state, which causes the DC output voltage Vo to rise from the second voltage value VL2 as depicted in FIG. 4.

After this, the DC output voltage Vo increases beyond the lower limit value VL1 of the reference voltage range and reaches the upper limit value VH1 of the reference voltage range at time t14. From time t14 onward, in the switching power supply device 1, the control unit 6 executes the steady-state operation in the heavy load state to control the DC output voltage Vo to be within the reference voltage range.

Next, the operation of the switching power supply device 1 when the load state changes from the heavy load state to the medium load state and from the medium load state to the light load state will be described with reference to FIGS. 5 and 6. Note that since the steady-state operation in the light load state, the steady-state operation in the medium load state, and the steady-state operation in the heavy load state are the same as the steady-state operations in the light load state, the medium load state, and the heavy load state described above with reference to FIG. 3, description thereof is omitted, and the operation when the load changes from the heavy load state to the medium load state and from the medium load state to the light load state will be described.

As one example, as depicted in FIG. 5, when the load changes to the medium load state at time t4 where the second driving control in the steady-state operation in the heavy load state is being executed, since the medium load state is entered in a state where two converter units 4 are being driven, the current is excessive as the current to be supplied to the load in the medium load state. Since the output capacitor Co is charged by the excessive part of the current, the DC output voltage Vo rises from the voltage value at time t4 (a voltage value that is above the lower limit value VL1 but is below the upper limit value VH1).

After this, the DC output voltage Vo rises further after reaching the upper limit value VH1 of the reference voltage range and then when the DC output voltage Vo that has risen reaches the first voltage value VH2 at time t5, the voltage comparator unit 5 detects this and outputs a comparison result indicating that the DC output voltage Vo has risen and reached the first voltage value VH2 to the control unit 6. The control unit 6 acquires this comparison result in the execution state of the first driving control, decreases the present number k1(=2) of converter units 4 being driven in the first driving control by the value k0(=1) to produce a new number k1(=1(=k1-k0)), and continues the first driving control with this new number k1. The control unit 6 also decreases the present number k2(=3) of converter units 4 to be driven in the second driving control by the value k0(=1) to produce a new number k2(=2(=k2-k0)). When the continuation of the first driving control with the new number k1(=1) has started, the control unit 6 determines whether there is leeway for further decreasing the number k1 (i.e., whether k1 is not zero), and on determining that there is such leeway (i.e., that k1 is not zero), acquires the comparison result outputted from the voltage comparator unit 5 at a time when the certain period Td has passed from the start of the continuation (in this example, time t5) and executes a second determination process that determines, based on the acquired comparison result, whether to change the number k1 used in the first driving control and the number k2 used in the second driving control. Here in this example, since there is leeway to further decrease the number k1 (since the number k1 is 1 and is not zero), the control unit 6 executes the second determination process.

In the continued state of the first driving control where the number k1 of converter units 4 to be driven in the medium load state is set at 1, as described above, the current outputted from one converter unit 4 is smaller than the current to be supplied to the load in the medium load state. Accordingly, the current is insufficient as the current to be supplied to the load in the medium load state. Since this insufficiency is covered by discharging of the output capacitor Co, the DC output voltage Vo falls as depicted in FIG. 5 from the first voltage value VH2. Here, in the second determination process described above, the control unit 6 acquires a comparison result indicating the DC output voltage Vo is below the first voltage value VH2 at a time where the certain period Td described above has passed (i.e., before time t6 is reached). For this reason, the control unit 6 determines that in the continued state of the first driving control after a comparison result indicating that the DC output voltage Vo has risen and reached the first voltage value VH2 was acquired, the state where the DC output voltage Vo is above the first voltage value VH2 did not continue for the certain period Td. Accordingly, at the time when the certain period Td has passed, the control unit 6 determines to not further change the number k1 used in the first driving control and the number k2 used in the second driving control.

After this, the DC output voltage Vo further falls after reaching the upper limit value VH1 of the reference voltage range and reaches the lower limit value VL1 of the reference voltage range at time t6. From time t6 until time t11, in the switching power supply device 1, the control unit 6 executes the steady-state operation in the medium load state to control the DC output voltage Vo to be within the reference voltage range.

As another example, as depicted in FIG. 5, when the load changes to the light load state at time t12 where the first driving control in the steady-state operation in the medium load state is being executed, since the light load state is entered in a state where only one converter unit 4 is being driven, the current is excessive as the current to be supplied to the load in the light load state. Since the output capacitor Co is charged by the excessive part of the current, the DC output voltage Vo rises from the voltage value at time t12 (a voltage value that is above the lower limit value VL1 but is below the upper limit value VH1).

After this, the DC output voltage Vo rises further after reaching the upper limit value VH1 of the reference voltage range and then when the DC output voltage Vo that has risen reaches the first voltage value VH2 at time t13, the voltage comparator unit 5 detects this and outputs a comparison result indicating that the DC output voltage Vo has risen and reached the first voltage value VH2 to the control unit 6. The control unit 6 acquires this comparison result in the execution state of the first driving control, decreases the present number k1(=1) of converter units 4 being driven in the first driving control by the value k0(=1) to produce a new number k1(=0(=k1-k0)), and continues the first driving control with this new number k1. The control unit 6 also decreases the present number k2(=2) of converter units 4 to be driven in the second driving control by the value k0(=1) to produce a new number k2(=1(=k2-k0)). When the continuation of the first driving control with the new number k1(=0) has started, the control unit 6 determines whether there is leeway for further decreasing the number k1 (i.e., whether k1 is not zero), and on determining that there is leeway for further decreasing the number k1, executes the second determination process described above. Here in this example, since the number k1 is zero and there is no leeway for further reducing the number k1, the control unit 6 does not execute the second determination process.

In the continued state of the first driving control where the number k1 of converter units 4 to be driven in the light load state is set at 0, since all of the converter units 4 enter the stopped state, the current is supplied to the load by discharging of the output capacitor Co, so that as depicted in FIG. 5, the DC output voltage Vo falls from the first voltage value VH2.

After this, the DC output voltage Vo falls further after reaching the upper limit value VH1 of the reference voltage range and reaches the lower limit value VL1 of the reference voltage range at time t14. From time t14 onward, in the switching power supply device 1, the control unit 6 executes the steady-state operation in the light load state to control the DC output voltage Vo to be within the reference voltage range.

As yet another example, as depicted in FIG. 6, when the load changes to the medium load state at time t5 where the second driving control in the steady-state operation in the heavy load state is being executed, since the medium load state is entered in a state where all three converter units 4 are being driven, the current is greatly excessive as the current to be supplied to the load in the medium load state. Since the output capacitor Co is charged by the excessive part of the current, the DC output voltage Vo rapidly rises from the voltage value at time t5 (a voltage value that is above the lower limit value VL1 but is below the upper limit value VH1).

After this, the DC output voltage Vo reaches the upper limit value VH1 of the reference voltage range at time t6. The voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control, which sets the number k1 of converter units 4 to be driven at 2, in place of the second driving control, which sets the number k2 of converter units 4 to be driven at 3, from time t6. Here, as described above, since the total of the currents outputted from two converter units 4 is larger than the current to be supplied to the load in the medium load state, there is an excess of current beyond the current to be supplied to the load in the medium load state. Since the output capacitor Co is charged by the excessive part of the current, the DC output voltage Vo further rises from the upper limit value VH1 and reaches the first voltage value VH2 at time t7.

When the DC output voltage Vo that has risen reaches the first voltage value VH2, the voltage comparator unit 5 detects this and outputs a comparison result indicating that the DC output voltage Vo has risen and reached the first voltage value VH2 to the control unit 6. The control unit 6 acquires this comparison result in the execution state of the first driving control, decreases the present number k1(=2) of converter units 4 being driven in the first driving control by the value k0(=1) to produce a new number k1(=1(=k1−k0)), and continues the first driving control with this new number k1. The control unit 6 also decreases the present number k2(=3) of converter units 4 to be driven in the second driving control by the value k0(=1) to produce a new number k2(=2(=k2−k0)). When the continuation of the first driving control with the new number k1(=1) has started, the control unit 6 determines whether there is leeway for further decreasing the number k1 (i.e., whether k1 is not zero), and on determining that there is such leeway (i.e., that k1 is not zero), executes the second determination process described above. Here in this example, since there is leeway for further decreasing the number k1 (since the number k1 is 1 and is not zero), the control unit 6 executes the second determination process.

In the continued state of the first driving control where the number k1 of converter units 4 to be driven in the medium load state is set at 1, as described above, the current outputted from one converter unit 4 is smaller than the current to be supplied to the load in the medium load state. Accordingly, the current is insufficient as the current to be supplied to the load in the medium load state. Since this insufficiency is covered by discharging of the output capacitor Co, the DC output voltage Vo falls from the first voltage value VH2. Here in this example, in the second determination process described above, the control unit 6 acquires a comparison result indicating the DC output voltage Vo is below the first voltage value VH2 at a time where the certain period Td described above has passed (i.e., before time t8 is reached). For this reason, the control unit 6 determines that in the continued state of the first driving control after a comparison result indicating that the DC output voltage Vo has risen and reached the first voltage value VH2 was acquired, the state where the DC output voltage Vo is above the first voltage value VH2 did not continue for the certain period Td. Accordingly, at the time when the certain period Td has passed, the control unit 6 determines to not further change the number k1 used in the first driving control and the number k2 used in the second driving control.

After this, the DC output voltage Vo further falls after reaching the upper limit value VH1 of the reference voltage range and reaches the lower limit value VL1 of the reference voltage range at time t8. From time t8 until time t12, in the switching power supply device 1, the control unit 6 executes the steady-state operation in the medium load state to control the DC output voltage Vo to be within the reference voltage range.

As another example, as depicted in FIG. 6, when the load changes to the light load state at time t13 where the second driving control in the steady-state operation in the medium load state is being executed, since the light load state is entered in a state where two converter units 4 are being driven, the current is greatly excessive as the current to be supplied to the load in the light load state. Since the output capacitor Co is charged by the excessive part of the current, the DC output voltage Vo rises more rapidly from the voltage value at time t13 (a voltage value that is above the lower limit value VL1 but is below the upper limit value VH1).

After this, the DC output voltage Vo reaches the upper limit value VH1 of the reference voltage range at time t14. The voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control, which sets the number k1 of converter units 4 to be driven at 1, in place of the second driving control, which sets the number k2 of converter units 4 to be driven at 2, from time t14. Here, as described above, since the current outputted from one converter unit 4 is larger than the current to be supplied to the load in the light load state, there is an excess of current beyond the current to be supplied to the load in the light load state. Since the output capacitor Co is charged by the excessive part of the current, the DC output voltage Vo further rises from the upper limit value VH1 and reaches the first voltage value VH2 at time t15.

When the DC output voltage Vo that has risen reaches the first voltage value VH2, the voltage comparator unit 5 detects this and outputs a comparison result indicating that the DC output voltage Vo has risen and reached the first voltage value VH2 to the control unit 6. The control unit 6 acquires this comparison result in the execution state of the first driving control, decreases the present number k1(=1) of converter units 4 being driven in the first driving control by the value k0(=1) to produce a new number k1(=0(=k1−k0)), and continues the first driving control with this new number k1. The control unit 6 also decreases the present number k2(=2) of converter units 4 to be driven in the second driving control by the value k0(=1) to produce a number k2(=1(=k2−k0)). When the continuation of the first driving control with the new number k1(=0) has started, the control unit 6 determines whether there is leeway for further decreasing the number k1 (i.e., whether k1 is not zero), and on determining that there is such leeway (i.e., that k1 is not zero), executes the second determination process described above. Here in this example, since the number k1 is zero and there is no leeway for further decreasing the number k1, the control unit 6 does not execute the second determination process.

In the continued state of the first driving control where the number k1 of converter units 4 to be driven in the light load state is set at 0, as described above, since all of the converter units 4 enter a stopped state, current is supplied to the load by discharging of the output capacitor Co, which causes the DC output voltage Vo to fall from the first voltage value VH2.

After this, the DC output voltage Vo falls further after reaching the upper limit value VH1 of the reference voltage range and reaches the lower limit value VL1 of the reference voltage range at time t16. From time t16 onward, in the switching power supply device 1, the control unit 6 executes the steady-state operation in the light load state to control the DC output voltage Vo to be within the reference voltage range.

Next, the operation of the switching power supply device 1 when the load state has greatly changed (i.e., when there is a change between the light load state and the heavy load state) will be described with reference to FIGS. 7 to 10. Note that since the steady-state operation in the light load state and the steady-state operation in the heavy load state are the same as the steady-state operations in the light load state and the heavy load state described above with reference to FIG. 3, description thereof is omitted.

As one example, as depicted in FIG. 7, when the load changes to the heavy load state at time t5 where the first driving control in the steady-state operation in the light load state is being executed, since all of the converter units 4 are in a stopped state, a larger current is supplied to the load by discharging of the output capacitor Co, resulting in the DC output voltage Vo falling more rapidly.

After this, at time t6, the DC output voltage Vo reaches the lower limit value VL1 of the reference voltage range. The voltage comparator unit 5 detects this and outputs a comparison result indicating that the DC output voltage Vo has fallen and reached the lower limit value VL1 of the reference voltage range to the control unit 6. The control unit 6 acquires this comparison result in the execution state of the first driving control and executes the second driving control, which sets the number k2 of converter units 4 to be driven at 1, in place of the first driving control, which sets the number k1 of converter units 4 to be driven at 0, from time t6. Here, as described above, the current outputted from one converter unit 4 is smaller than the current to be supplied to the load in the heavy load state, so that the current is insufficient as the current to be supplied to the load in the heavy load state. Since this insufficiency is covered by discharging of the output capacitor Co, the DC output voltage Vo falls further from the lower limit value VL1.

After this, at time t7 when the DC output voltage Vo that has fallen reaches the second voltage value VL2, the voltage comparator unit 5 detects this and outputs a comparison result indicating that the DC output voltage Vo has fallen and reached the second voltage value VL2 to the control unit 6. The control unit 6 acquires this comparison result in the execution state of the second driving control, increases the present number k2(=1) of converter units 4 being driven in the second driving control by the value k0(=1) to produce a new number k2(=2(=k2+k0)), and continues the second driving control with this new number k2. The control unit 6 also increases the present number k1(=0) of converter units 4 to be driven in the first driving control by the value k0(=1) to produce a new number k1(=1(=k1+k0)). When the continuation of the second driving control with the new number k2(=2) has started, the control unit 6 determines whether there is leeway for further increasing the number k2 (i.e., whether k2<n), and on determining that there is such leeway (i.e., that k2 does not equal n), executes the first determination process described above. Here in this example, since there is leeway for further increasing the number k2 (since the number k2 is two, which is lower than n=3), the control unit 6 executes the first determination process.

For the heavy load state, even in the continued state of the second driving control where the number k2 of converter units 4 to be driven is set at 2, as described above, the total of the currents outputted from two converter units 4 is smaller than the current to be supplied to the load in the heavy load state, so that the current is insufficient as the current to be supplied to the load in the heavy load state. Since this insufficiency is covered by discharging of the output capacitor Co, the DC output voltage Vo falls further from the second voltage value VL2. Here in this example, in the first determination process described above, the control unit 6 acquires a comparison result indicating that the DC output voltage Vo is below the first voltage value VH2 at a time where the certain period Td described above has passed (i.e., at time t8). For this reason, the control unit 6 determines that in the continued state of the second driving control after a comparison result indicating that the DC output voltage Vo has fallen and reached the second voltage value VL2 was acquired, the state where the DC output voltage Vo is below the second voltage value VL2 has continued for the certain period Td.

Accordingly, at time t8, the control unit 6 further increases the present number k2(=2) of converter units 4 being driven in the second driving control by the value k0(=1) to produce a new number k2(=3(=k2+k0)), and continues the second driving control with this new number k2. The control unit 6 also increases the present number k1(=1) of converter units 4 to be driven in the first driving control by the value k0(=1) to produce a new number k1(=2(=k1+k0)). Here, as described above, since the total of the currents outputted from three converter units 4 is greater than the current to be supplied to the load in the heavy load state, the total current is excessive as the current to be supplied to the load in the heavy load state. Since the output capacitor Co is charged by the excessive part of the current, the DC output voltage Vo rises from the voltage value at time t8 (a voltage value that is below the second voltage value VL2).

After this, the DC output voltage Vo rises further after reaching the second voltage value VL2 and the lower limit value VL1 of the reference voltage range and then reaches the upper limit value VH1 of the reference voltage range at time t9. From time t9 onward, in the switching power supply device 1, the control unit 6 executes the steady-state operation in the heavy load state to control the DC output voltage Vo to be within the reference voltage range.

As another example, as depicted in FIG. 8, when the load changes to the heavy load state at time t6 where the second driving control in the steady-state operation in the light load state is being executed, since the heavy load state is entered in a state where only one converter unit 4 is being driven, the current is greatly insufficient as the current to be supplied to the load in the heavy load state. Since this insufficiency is covered by discharging of the output capacitor Co, the DC output voltage Vo falls from the voltage value at time t6 (a voltage value that is below the upper limit value VH1).

After this, the DC output voltage Vo falls further after reaching the lower limit value VL1 of the reference voltage range, and when the DC output voltage Vo that has fallen reaches the second voltage value VL2 at time t7, the voltage comparator unit 5 detects this and outputs a comparison result indicating that the DC output voltage Vo has fallen and reached the second voltage value VL2 to the control unit 6. The control unit 6 acquires this comparison result in the execution state of the second driving control, increases the present number k2(=1) of converter units 4 being driven in the second driving control by the value k0(=1) to produce a new number k2(=2(=k2+k0)), and continues the second driving control with this new number k2. The control unit 6 also increases the present number k1(=0) of converter units 4 to be driven in the first driving control by the value k0(=1) to produce a new number k1(=1(=k1+k0)). When the continuation of the second driving control with the new number k2(=2) has started, the control unit 6 determines whether there is leeway for further increasing the number k2 (i.e., whether k2<n), and on determining that there is such leeway (i.e., that k2 does not equal n), executes the first determination process described above. Here in this example, since there is leeway for further increasing the number k2 (i.e., the number k2 is 2, which is lower than n=3), the control unit 6 executes the first determination process.

For the heavy load state, even in the continued state of the second driving control where the number k2 of converter units 4 to be driven is set at 2, as described above, the total of the currents outputted from two converter units 4 is smaller than the current to be supplied to the load in the heavy load state, so that the total current is insufficient as the current to be supplied to the load in the heavy load state. Since this insufficiency is covered by discharging of the output capacitor Co, the DC output voltage Vo falls further from the second voltage value VL2. Here, in the first determination process described above, the control unit 6 acquires a comparison result indicating that the DC output voltage Vo is below the first voltage value VH2 at a time where the certain period Td described above has passed (i.e., at time t8) and determines that in the continued state of the second driving control after a comparison result indicating that the DC output voltage Vo has fallen and reached the second voltage value VL2 was acquired, the state where the DC output voltage Vo was below the second voltage value VL2 has continued for the certain period Td.

Accordingly, at time t8, the control unit 6 further increases the present number k2(=2) of converter units 4 being driven in the second driving control by the value k0(=1) to produce a new number k2(=3(=k2+k0)) and continues the second driving control with the new number k2. The control unit 6 also further increases the present number k1(=1) of converter units 4 to be driven in the first driving control by the value k0(=1) to produce a new number k1(=2(k1+k0)). Here, as described above, since the total current outputted from the three converter units 4 is larger than the current to be supplied to the load in the heavy load state, the total current is excessive as the current to be supplied to the load in the heavy load state. Since the output capacitor Co is charged by the excessive part of the current, the DC output voltage Vo rises from the voltage value at time t8 (a voltage value that is below the second voltage value VL2).

After this, the DC output voltage Vo rises further after reaching the second voltage value VL2 and the lower limit value VL1 of the reference voltage range and reaches the upper limit value VH1 of the reference voltage range at time t9. From time t9 onward, in the switching power supply device 1, the control unit 6 executes the steady-state operation in the heavy load state to control the DC output voltage Vo to be within the reference voltage range.

As another example, as depicted in FIG. 9, when the load changes to the light load state at time t6 where the first driving control in the steady-state operation in the heavy load state is being executed, since the light load state is entered in a state where two converter units 4 are being driven, the current is greatly excessive as the current to be supplied to the load in the light load state. Since the output capacitor Co is charged by the excessive part of the current, the DC output voltage Vo rises from the voltage value at time t6 (a voltage value that is above the lower limit value VL1 but below the upper limit value VH1).

After this, the DC output voltage Vo rises further after reaching the upper limit value VH1 of the reference voltage range, and when the DC output voltage Vo that has risen reaches the first voltage value VH2 at time t7, the voltage comparator unit 5 detects this and outputs a comparison result indicating that the DC output voltage Vo has risen and reached the first voltage value VH2 to the control unit 6. The control unit 6 acquires this comparison result in the execution state of the second driving control, decreases the present number k1(=2) of converter units 4 being driven in the first driving control by the value k0(=1) to produce a new number k1(=1(=k1-k0)), and continues the first driving control with this new number k1. The control unit 6 also decreases the present number k2(=3) of converter units 4 to be driven in the second driving control by the value k0(=1) to produce a new number k2(=2(=k2-k0)). When the continuation of the first driving control with the new number k1(=1) has started, the control unit 6 determines whether there is leeway for further decreasing the number k1 (i.e., whether k1 is not zero), and on determining that there is such leeway (i.e., that k1 is not zero), executes the second determination process described above. Here in this example, since there is leeway for further decreasing the number k1 (i.e., the number k1 is 1, which is not zero), the control unit 6 executes the second determination process.

For the light load state, even in the continued state of the first driving control where the number k1 of converter units 4 to be driven is set at 1, as described above, the current outputted from one converter unit 4 is larger than the current to be supplied to the load in the light load state, so that the current is excessive as the current to be supplied to the load in the heavy load state. Since the output capacitor Co is charged by the excessive part of the current, the DC output voltage Vo further rises from the first voltage value VH2. In this example, in the second determination process described above, the control unit 6 acquires a comparison result indicating that the DC output voltage Vo is above the first voltage value VH2 from the voltage comparator unit 5 at a time where the certain period Td described above has passed (i.e., at time t8). For this reason, the control unit 6 determines that in the continued state of the first driving control after the comparison result indicating that the DC output voltage Vo has risen and reached the second voltage value VL2 was acquired, the state where the DC output voltage Vo is above the first voltage value VH2 has continued for the certain period Td.

Accordingly, at time t8, the control unit 6 further decreases the present number k1 of converter units 4 being driven in the first driving control by the value k0(=1) to produce a new number k1(=0(=k1-k0) and continues the first driving control with the new value k1. The control unit 6 also decreases the present number k2(=2) of converter units 4 to be driven in the second driving control by the value k0(=1) to produce a new number k2(=1(=k2-k0). Here, since all of the converter units 4 enter a stopped state, current is supplied to the load by discharging of the output capacitor Co, which causes the DC output voltage Vo to fall from the voltage value at time t8 (a voltage value that is above the first voltage value VH2).

After this, the DC output voltage Vo falls further after reaching the first voltage value VH2 and the upper limit value VH1 of the reference voltage range and reaches the lower limit value VL1 of the reference voltage range at time t9. From time t9 onward, in the switching power supply device 1, the control unit 6 executes the steady-state operation in the light load state to control the DC output voltage Vo to be within the reference voltage range.

As another example, as depicted in FIG. 10, when the load changes to the light load state at time t5 where the second driving control in the steady-state operation in the heavy load state is being executed, since the light load state is entered in a state where three converter units 4 are being driven, the current is greatly excessive as the current to be supplied to the load in the light load state. Since the output capacitor Co is charged by the excessive part of the current, the DC output voltage Vo rises from the voltage value at time t5 (a voltage value that is above the lower limit value VL1 but below the upper limit value VH1).

After this, when the DC output voltage Vo rises and reaches the upper limit value VH1 of the reference voltage range at time t6, the voltage comparator unit 5 detects this and outputs a comparison result indicating that the DC output voltage Vo has risen and reached the upper limit value VH1 of the reference voltage range to the control unit 6. The control unit 6 acquires this comparison result in the execution state of the second driving control and executes the first driving control, which sets the number of converter units 4 to be driven at k1(=2), in place of the second driving control described above from time t6. Here, since the light load state continues in a state where two converter units 4 are being driven, the total current is excessive as the current to be supplied to the load in the light load state. Since the output capacitor Co is charged by the excessive part of the current, the DC output voltage Vo further rises from the upper limit value VH1.

After this, when the DC output voltage Vo that has risen reaches the first voltage value VH2 at time t7, the voltage comparator unit 5 detects this and outputs a comparison result indicating that the DC output voltage Vo has risen and reached the first voltage value VH2 to the control unit 6. The control unit 6 acquires this comparison result in the execution state of the first driving control, decreases the present number k1(=2) of converter units 4 being driven in the first driving control by the value k0(=1) to produce a new number k1(=1(=k1−k0)), and continues the first driving control with this new number k1. The control unit 6 also decreases the present number k2(=3) of converter units 4 to be driven in the second driving control by the value k0(=1) to produce a new number k2(=2(=k2−k0)). When the continuation of the first driving control with the new number k1(=1) has started, the control unit 6 determines whether there is leeway for further decreasing the number k1 (i.e., whether k1 is not zero), and on determining that there is such leeway (i.e., that k1 is not zero), executes the second determination process described above. In this case, since there is leeway for further decreasing the number k1 (since the number k1 is 1 and is not zero), the control unit 6 executes the second determination process.

For the light load state, even in the continued state of the first driving control where the number k1 of converter units 4 to be driven is set at 1, as described above, the current outputted from one converter unit 4 is larger than the current to be supplied to the load in the light load state, the current is excessive as the current to be supplied to the load in the light load state. Since the output capacitor Co is charged by the excessive part of the current, the DC output voltage Vo further rises from the first voltage value VH2. Here, in the second determination process described above, the control unit 6 acquires a comparison result indicating that the DC output voltage Vo is above the first voltage value VH2 from the voltage comparator unit 5 at a time (time t8) when the certain period Td described above has passed, and determines that in the continued state of the first driving control after the comparison result indicating that the DC output voltage Vo has reached the first voltage value VH2 was acquired, the state where the DC output voltage Vo is above the first voltage value VH2 has continued for the certain period Td.

Accordingly, at time t8, the control unit 6 further decreases the present number k1(=1) of converter units 4 being driven in the first driving control by the value k0(=1) to produce a new number k1(=0(=k1−k0) and continues the first driving control with this new number k1. The control unit 6 also further decreases the present number k2(=2) of converter units 4 to be driven in the second driving control by the value k0(=1) to produce a new number k2(=1(=k1−k0). Here, since all of the converter units 4 enter the stopped state, current is supplied to the load by discharging of the output capacitor Co, which causes the DC output voltage Vo to fall from the voltage value at time t8 (a voltage value that is above the first voltage value VH2).

After this, the DC output voltage Vo falls further after reaching the first voltage value VH2 and the upper limit value VH1 of the reference voltage range and then reaches the lower limit value VL1 of the reference voltage range at time t9. From time t9 onward, in the switching power supply device 1, the control unit 6 executes the steady-state operation in the light load state to control the DC output voltage Vo to be within the reference voltage range.

In this way, in the switching power supply device 1, in the steady-state operations in the light load state, the medium load state, and the heavy load state, the control unit 6 repeatedly executes the first driving control that sets the number (driven number) of converter units 4 at k1 (that takes the value 0 in the light load state, the value 1 in the medium load state, and the value 2 in the heavy load state) and the second driving control that sets the number of converter units 4 at k2 (that takes the value 1 in the light load state, the value 2 in the medium load state, and the value 3 in the heavy load state) to control the variations (or "ripples") in the DC output voltage Vo to be within the reference voltage range.

Accordingly, with the switching power supply device 1, compared to a conventional switching power supply device that controls variations in the DC output voltage so as to be within a single voltage range (a voltage range defined by one upper limit value and one lower limit value) by performing driving control that simultaneously drives or simultaneously stops all of the converter units 4 in any of the load states, it is possible, while keeping the output power the same in the heavy load state (i.e., while increasing the output power by connecting the converter units 4 in parallel), to reduce the number of converter units 4 driven in the light load state, which improves efficiency.

Also, when a comparison result indicating that the DC output voltage Vo has risen and reached the first voltage value VH2 is acquired in an execution state of the first driving control, the control unit 6 in the switching power supply device 1 decreases the number k1 of converter units 4 used in the first driving control by the value k0 (the value 1 in the example described above), continues the first driving control with the new number k1 for the first driving control, and decreases the number k2 of converter units 4 used in the second driving control by the value k0(=1) to produce a new number k2 for the second driving control. When a comparison result indicating that the DC output voltage Vo has fallen and reached the second voltage value VL2 is acquired in the execution state of the second driving control, the control unit 6 increases the number k2 by the value k0(=1), continues the second driving control with the new number k2 for the second driving control, and increases the number k1 by the value k0(=1) to produce a new number k1 for the first driving control.

Accordingly, with the switching power supply device 1, even if the load state changes to a smaller load (as examples, when changing between a heavy load state and a medium load state and when changing between a medium load state and a light load state), it is possible to smoothly transition to steady-state operation in the changed-to load state, which means that it is possible to control variations (ripples) in the DC output voltage Vo to be within the reference voltage range.

Also, in the switching power supply device 1, when, in a continued state of the first driving control after a comparison result indicating that the DC output voltage Vo has risen and reached the first voltage value VH2 was acquired, a comparison result indicating that the DC output voltage Vo is above the first voltage value VH2 has been continuously acquired for the certain period Td, the control unit 6 further decreases the number k1 by the value k0(=1) to produce a new number k1 for the first driving control, continues the first driving control, and further decreases the number k2 by the value k0(=1) to produce a new number k2 for the second driving control. Similarly, when, in a continued state of the second driving control after a comparison result indicating that the DC output voltage Vo has fallen and reached the second voltage value VL2 was acquired, a comparison result indicating that the DC output voltage Vo is below the second voltage value VL2 has been continuously acquired for the certain period Td, the control unit 6 further increases the number k2 by the value k0(=1) to produce a new number k2 for the second driving control, continues the second driving control, and further increases the number k1 by the value k0(=1) to produce a new number k1 for the first driving control.

Accordingly, with the switching power supply device 1, even if there is a large change in the load state (for example, when changing between the heavy load state and the light load state), it is possible to smoothly transition to steady-state operation in the changed-to load state, which means that it is possible to reliably control variations (ripples) in the DC output voltage Vo to be within the reference voltage range.

Also, with the switching power supply device 1, during steady-state operation in a state where the load is constant (that is, steady-state operation in the light load state, steady-state operation in the medium load state, and steady-state operation in the heavy load state), as described above (with reference to FIGS. 11 to 13), the control unit 6 generates the three driving voltages $Vp_1$, $Vp_2$, and $Vp_3$ with the same frequencies (burst frequencies) and the same time ratios and with phases that are respectively shifted by a predetermined period (that is, ⅓ of the burst cycle) and outputs the voltages to drive the converter units $4_1$, $4_2$, and $4_3$.

Accordingly, with the switching power supply device 1, during steady-state operation in a state where the load is constant, it is possible to balance the utilization ratios of the three converter units $4_1$, $4_2$, and $4_3$. By doing so, it is possible to reduce the loads placed on individual converter units 4, which makes it possible to use small heat sinks. Also, with the switching power supply device 1, compared to a conventional switching power supply device (i.e., a switching power supply device that performs control so that the variations in the DC output voltage are kept within a single voltage range by performing driving control that drives all of the converter units 4 at the same time and stops all of the converter units 4 during steady-state operation in a state where the load is constant), it is possible to lengthen the burst cycles (i.e., the cycles in which a driving period and a stopping period are repeated) of the individual converter units 4 when making the ripples in the DC output voltage Vo have the same voltage width (i.e., it is possible to lower the burst frequency), which makes it possible to further raise efficiency.

Figure 14:
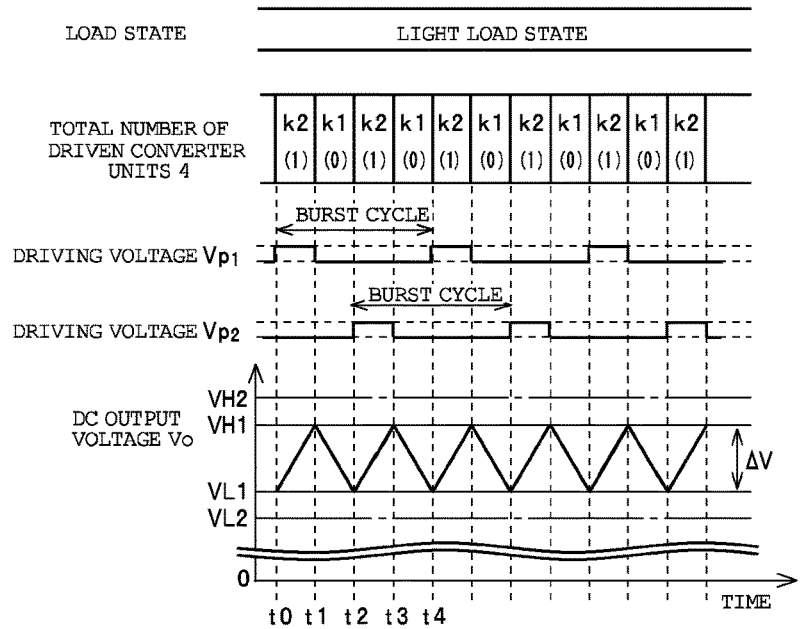
FIG. 14 is a diagram useful in explaining a steady-state operation in the light load state of a switching power supply device 1 with two converter units 4.
Figure 15:
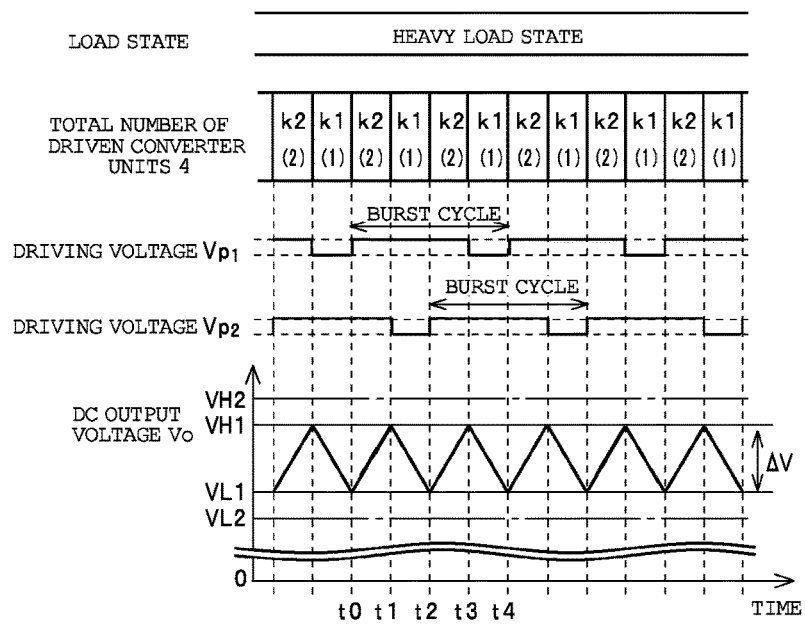
FIG. 15 is a diagram useful in explaining a steady-state operation in the heavy load state of the switching power supply device 1 with two converter units 4.

Note that although the switching power supply device 1 described above uses a configuration with three converter units 4 connected in parallel as one example, the number of converter units 4 to be connected in parallel can be any arbitrary number that is three or higher, such as four or five, and it is also possible to use a configuration with two converter units 4. As one example, with a switching power supply device 1 configured with two converter units 4 connected in parallel, the control unit 6 is capable, as depicted in FIG. 14, of steady-state operation in a light load state by repeatedly executing the first driving control that drives k1 (where k1=0) converter units 4 out of the two converter units 4 and the second driving control that drives k2 (where k2=1) converter units 4 out of the two converter units 4 and capable, as depicted in FIG. 15, of steady-state operation in a heavy load state by repeatedly executing the first driving control that drives k1 (where k1=1) converter units 4 out of the two converter units 4 and the second driving control that drives k2 (where k2=2) converter units 4 out of the two converter units 4.

With this switching power supply device 1 that uses a configuration with two converter units 4 connected in parallel, it is possible to achieve the same effects as the switching power supply device 1 described above that uses a configuration with three converter units 4 connected in parallel, so that compared to the conventional switching power supply device described above, it is possible to lengthen the burst cycles (i.e., the cycles in which a driving period and a stopping period are repeated) of the individual converter units 4 when making the ripples in the DC output voltage Vo have the same voltage width (i.e., it is possible to lower the burst frequency).

Figure 19:
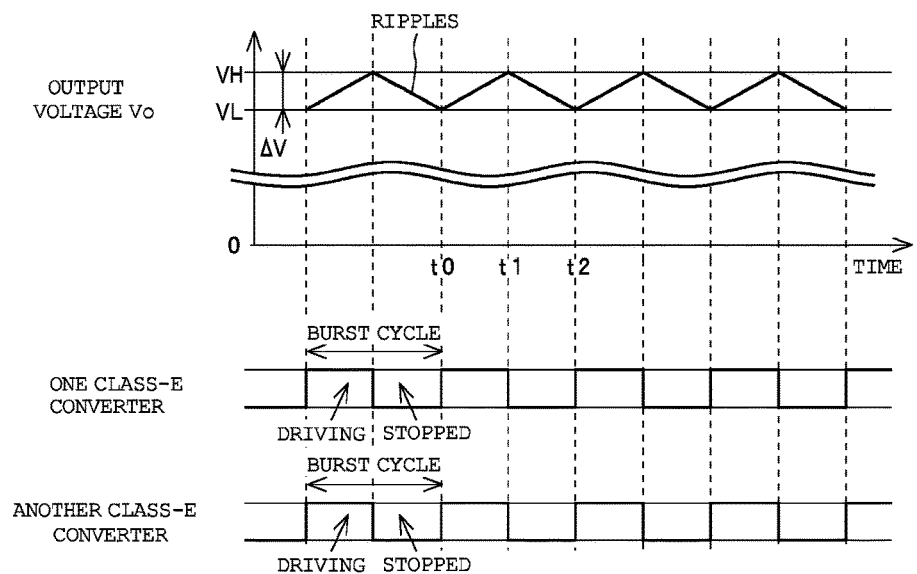
FIG. 19 is a diagram useful in explaining the operation of a switching power supply device as a comparative example.

Next, the relationship between the burst frequencies in the steady-state operations of the switching power supply device 1 in the light load state depicted in FIG. 14 and the heavy load state depicted in FIG. 15 and the burst frequency of the conventional switching power supply device described with reference to FIG. 19 will be described, with a switching power supply device 1 that uses a configuration with two converter units 4 connected in parallel as an example. Note that the conventional switching power supply device as a comparative example is configured with a plurality of Class-E converter circuits (here, two converter units $4_1$ and $4_2$, which is the same as the embodiment of the switching power supply device 1 described above where n=2), which are configured to repeat a driving period and a stopping period based on a comparison of the output voltage (DC output voltage) Vo with a high-level reference voltage VH and a low-level reference voltage VL, simply connected in parallel.

In this case, as a precondition, assume that the capacitance of the output capacitor Co is C, the width of the reference voltage range (i.e., the difference between the upper limit value VH1 and the lower limit value VL1), and the difference between the high-level reference voltage VH and the low-level reference voltage VL are both ΔV. It is also assumed that the currents outputted from the converter units $4_1$ and $4_2$ during driving are respectively $i_{41}$ and $i_{42}$ and that the maximum load current $i_{MAX}$ is $i_{MAX}=i_{41}+i_{42}$. It is assumed that $i_{41}=i_{42}$. When it is assumed that the load factor is a, the load current $i_2=a \times i_{MAX}$.

First, in the waveform diagram in FIG. 14 where the switching power supply device 1 according to the present embodiment composed of the two converter units $4_1$ and $4_2$ is operated in the light load state, by calculating the lengths of the periods in the driving state and the stopping state and summing the lengths, the repeating cycle of the driving periods and stopping periods of the converter units $4_1$ and $4_2$ is calculated to calculate the repeating frequency $f_1$ (the reciprocal of the repeating cycle).

When calculated from the current when charging and discharging the output capacitor Co and changes in voltage, the respective lengths of the period from time t0 to t1, the period from time t1 to t2, the period from time t2 to t3, and the period from time t3 to t4 are expressed by Expressions (1), (2), (3), and (4) below.

[Expression 1]
[Expression 2]
[Expression 3]
[Expression 4]

Next, Expressions (1) to (4) above are summed to calculate the length of the period from time t0 to t4 and then rearranged to give Expression (5) below.

[Expression 5]

The repeating frequency $f_1$, which is the reciprocal of the length of the period from time t0 to t4, is indicated in Expression (6) below. Note that the range of the load factor a for which Expression (6) holds is expressed in Expression (7) below.

[Expression 6]
[Expression 7]

In the waveform diagram in FIG. 15 where the switching power supply device 1 according to the present embodiment composed of the two converter units $4_1$ and $4_2$ is operated in the heavy load state, by calculating the lengths of the periods in the driving state and the stopping state and summing the lengths, the repeating cycle of the driving periods and stopping periods of the converter units $4_1$ and $4_2$ is calculated to calculate the repeating frequency $f_1$ (the reciprocal of the repeating cycle).

First, when calculated from the current when charging and discharging the output capacitor Co and changes in voltage, the respective lengths of the period from time t0 to t1, the period from time t1 to t2, the period from time t2 to t3, and the period from time t3 to t4 are expressed in Expressions (8), (9), (10), and (11) below.

[Expression 8]
[Expression 9]
[Expression 10]
[Expression 11]

Next, Expressions (8) to (11) above are summed to calculate the length of the period from time t0 to t4 and then rearranged to give Expression (12) below.

[Expression 12]

The repeating frequency f2, which is the reciprocal of the length of the period from t0 to t4, is indicated in Expression (13) below. Note that the range of the load factor a for which Expression (13) holds is expressed in Expression (14) below.

[Expression 13]
[Expression 14]

Also, by calculating the lengths of the periods in the driving state and the stopping state of the converter units $4_1$ and $4_2$ in the switching power supply device that is the comparative example where the two converter units $4_1$ and $4_2$ connected in parallel are operated as described above with reference to FIG. 19, and summing the lengths, the repeating cycle of the driving periods and stopping periods of the converter units $4_1$ and $4_2$ in this case is calculated to calculate the repeating frequency $f_0$ (the reciprocal of the repeating cycle). When calculated from the current when charging and discharging the output capacitor Co and changes in voltage, the respective lengths of the period from time t0 to t1 and the period from time t1 to t2 are expressed in Expressions (15) and (16) below.

[Expression 15]
[Expression 16]

Next, Expressions (15) and (16) above are summed to calculate the length of the period from time t0 to t2 and then rearranged to give Expression (17) below.

[Expression 17]

The repeating frequency $f_0$ that is the reciprocal of the length of the period time t0 to t2 is expressed in Expression (18) below. Note that the range of the load factor a for which Expression (13) holds is 0≤a<1.

[Expression 18]

Figure 16:
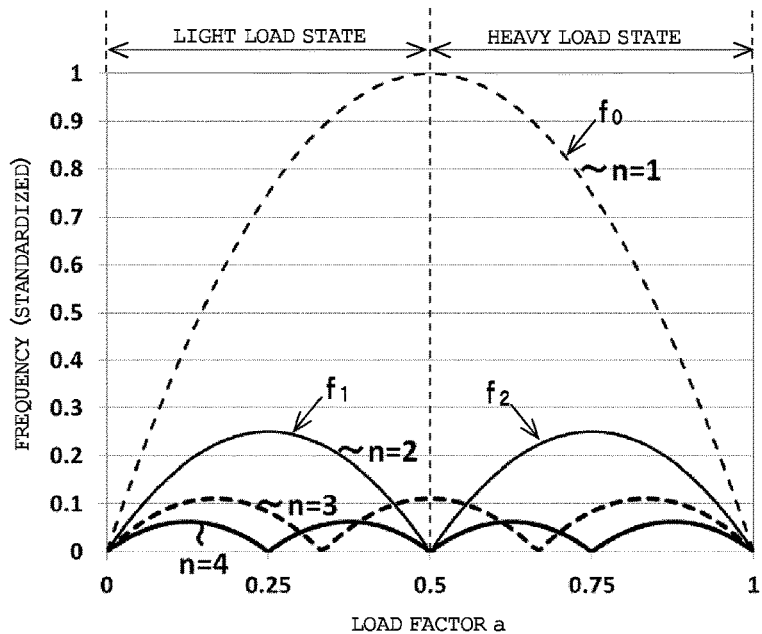
FIG. 16 is a characteristics graph depicting the relationship between a load factor a and a frequency (burst frequency) for the switching power supply device 1 and a switching power supply device as a comparative example.

A graph that compares the repeating frequencies $f_1$ and $f_2$ of the driving periods and the stopping periods of the individual converter units 4 of the switching power supply device 1 according to the present embodiment with the repeating frequency $f_0$ of the driving periods and the stopping periods of the converter units 4 of the switching power supply device that is the comparative example is depicted in FIG. 16. In FIG. 16, the horizontal axis is the load factor a and the vertical axis is the repeating frequency that has been standardized. The result of multiplying the values on the vertical axis by $i_{MAX}/(4C\Delta V)$ gives the actual frequencies.

As depicted in FIG. 16, with the switching power supply device 1 according to the present embodiment, under conditions where the maximum load current $i_{MAX}$, the capacitance C of the output capacitor Co, and the voltage range of the ripples in the DC output voltage Vo (i.e., the difference between the upper limit value and the lower limit value) $\Delta V$ are the same, it is possible to greatly lower the repeating frequency of the driving periods and the stopping periods of the respective converter units 4 compared to the switching power supply device of the comparative example across substantially the entire range of the load factor a (i.e., almost the entire range aside from when a=0 and its vicinity and when a=1 and its vicinity). More specifically, the maximum values of the repeating frequencies $f_1$ and $f_2$ (i.e., the frequencies when the load factor is 0.25 or 0.75) in the switching power supply device 1 according to the present embodiment are expressed by Expression (19) below. On the other hand, the maximum values of the repeating frequency f0 (i.e., the frequency when the load factor is 0.25) in the switching power supply device 1 that is the comparative example is expressed by Expression (20) below.

[Expression 19]
[Expression 20]

Also, although not illustrated, for the condition where the value k0=1, the burst frequency when the control unit 6 repeatedly executes the first driving control that drives (k−1) as the number k1 out of the n converter units 4 and the second driving control that drives k as the number k2 out of the n converter units 4 is expressed by Expression (21) below, and the range of the load factor a for which Expression (21) holds is expressed by Expression (22) below. The maximum value of the burst frequency is expressed by Expression (23) below. As examples, the relationship between the burst frequency and the load factor a when the number n is set at 3 and the relationship between the burst frequency and the load factor a when the number n is set at 4 are depicted in FIG. 16.

[Expression 21]
[Expression 22]
[Expression 23]

With this type of converter unit 4 (i.e., resonant converter circuits such as Class-E type converters), it takes several switching cycles for a resonance operation to stabilize following startup, and losses until the resonance operation stabilizes are large compared to losses during stable operation. This means that when the repeating frequency of the driving periods and stopping periods of the converter units 4 is high, losses increase due to the converter units 4 frequently starting and stopping. With the switching power supply device 1 according to the present embodiment however, since the repeating frequency of the driving periods and stopping periods (that is, the burst frequency) can be lowered as described above, it is possible to improve the efficiency of the device.

Note that although the switching power supply device 1 described above uses a configuration where the value k0 used when increasing and decreasing the number k1 of converter units 4 driven in the first driving control and the number k2 of converter units 4 driven in the second first driving control is set at 1, the value k0 is not limited to 1 and can be set at a plural number, such as 2 or 3, in keeping with the number n of converter units 4.

Also, although examples where the number n of converter units 4 is respectively 3 and 2 have been described above, when the number n is 4 or larger, it is similarly possible to control the DC output voltage Vo to be within the reference voltage range by executing, in each load state, a steady-state operation which repeats the first driving control that sets the number of converter units 4 subject to driving control at k1 and the second driving control that sets the number of converter units 4 subject to driving control at k2, with k1 and k2 set according to the load state.

As one example, with the switching power supply device 1, when the load state has changed to a heavier load state, the number k1 of converter units 4 subject to driving control in the first driving control is increased by the value k0 to set a new number k1(←k1+k0), the number k2 of converter units 4 subject to driving control in the second driving control is increased by the value k0 to set a new number k2(←k2+k0), when determined necessary in the first determination process, these numbers k1 and k2 are further increased by the value k0 to produce new numbers k1 and k2, and a steady-state operation that repeats, in the changed-to load state, the first driving control that sets the number of converter units 4 subject to driving control at the new number k1 and the second driving control that sets the number of converter units 4 subject to driving control at the new number k2 is executed.

Similarly, when the load state has changed to a lighter load state, the number k1 of converter units 4 subject to driving control in the first driving control is decreased by the value k0 to set a new number k1(←k1−k0), the number k2 of converter units 4 subject to driving control in the second driving control is decreased by the value k0 to set a new number k2(←k2−k0), when determined necessary in the second determination process, these numbers k1 and k2 are further decreased by the value k0 to produce new numbers k1 and k2, and a steady-state operation that repeats, in the changed-to load state, the first driving control that sets the number of converter units 4 subject to driving control at the new number k1 and the second driving control that sets the number of converter units 4 subject to driving control at the new number k2 is executed.

By doing so, in the switching power supply device 1, every time the load state changes, by changing (i.e., increasing or decreasing) the number k1 of converter units 4 subjected to driving control in the first driving control and the number k2 of converter units 4 subjected to driving control in the second driving control to new numbers k1 and k2 corresponding to the changed-to load state, and executing the steady-state operation that repeats the first driving control that sets the number of converter units 4 subjected to driving control at the new number k1 and the second driving control that sets the number of converter units 4 subjected to driving control at the new number k2, it is possible to control the DC output voltage Vo to be within the reference voltage range in every load state.

Next, the operation of a switching power supply device 1 where the number n of converter units 4 is four or higher will be described by way of a specific example where the number n is 4 and the value k0 is 1. In this case, there are four load states, namely a light load state, a first medium load state, a second medium load state (i.e., a heavier load state than the first medium load state), and a heavy load state. In the light load state, the control unit 6 controls the DC output voltage Vo to be within the reference voltage range by executing the steady-state operation in the light load state that repeats first driving control that sets the number of converter units 4 to be driven at k1(=0) and second driving control that sets the number of converter units 4 to be driven at k2(=1). In the first medium load state, the control unit 6 controls the DC output voltage Vo to be within the reference voltage range by executing the steady-state operation in the first medium load state that repeats first driving control that sets the number of converter units 4 to be driven at k1(=1) and second driving control that sets the number of converter units 4 to be driven at k2(=2). In the second medium load state, the control unit 6 controls the DC output voltage Vo to be within the reference voltage range by executing the steady-state operation in the second medium load state that repeats first driving control that sets the number of converter units 4 to be driven at k1(=2) and second driving control that sets the number of converter units 4 to be driven at k2(=3). In the heavy load state, the control unit 6 controls the DC output voltage Vo to be within the reference voltage range by executing the steady-state operation in the heavy load state that repeats first driving control that sets the number of converter units 4 to be driven at k1(=3) and second driving control that sets the number of converter units 4 to be driven at k2(=4).

Out of the operations of a switching power supply device 1 of this configuration, since the steady-state operations in the four load states described above, the operation when the load state changes by one level (as one example, when the load state changes between the light load state and the first medium load state), and the operation when the load state changes by two levels (as one example, when the load state changes between the light load state and the second medium load state so as to skip the first medium load state) are the same as the operations of the switching power supply device 1 described above where the number n of converter units 4 is 3, description thereof is omitted. For this reason, the following describes the operations for changes in the load state that cannot occur in the switching power supply device 1 where the number n of converter units 4 is 3, that is, the operation when the load state changes by three levels (that is, when the load state changes between the light load state and the heavy load state so as to skip the first medium load state and the second medium load state).

Figure 17:
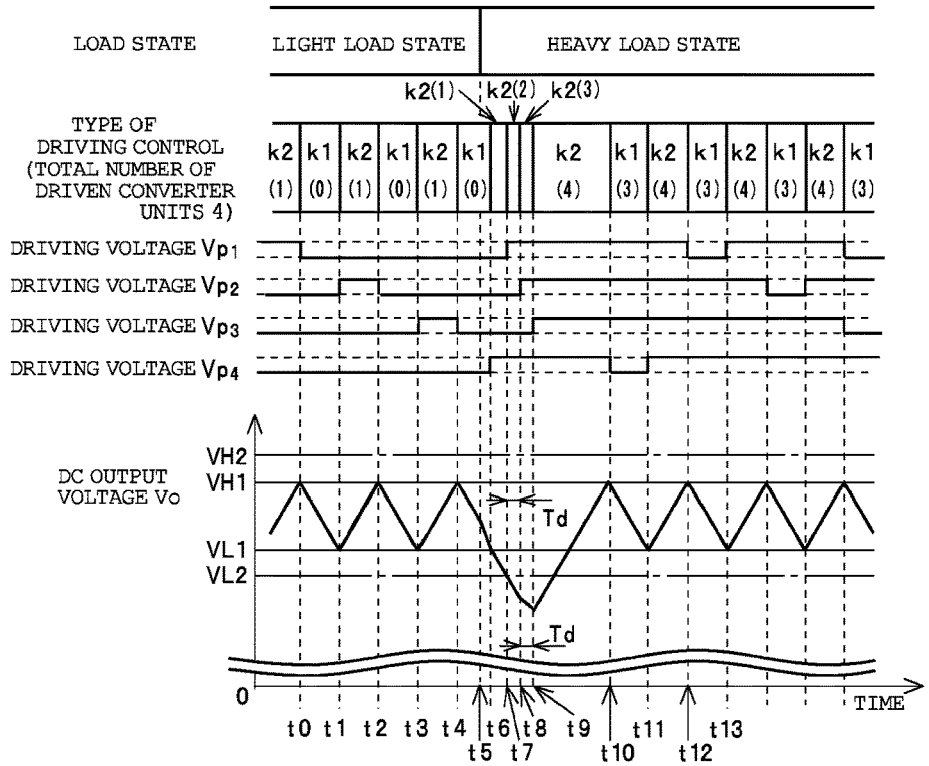
FIG. 17 is a diagram useful in explaining an operation of the switching power supply device 1 (where the number n of converter units 4 is 4) when there is a change from the light load state to the heavy load state.

As one example, as depicted in FIG. 17, when, at time t5 during execution of the first driving control in the steady-state operation in the light load state, the load changes to the heavy load state so as to skip the first medium load state and the second medium load state, since all of the converter units 4 are in the stopped state and more current is to be supplied to the load by discharging of the output capacitor Co, the DC output voltage Vo falls more rapidly.

After this, at time t6, the DC output voltage Vo reaches the lower limit value VL1 of the reference voltage range. The voltage comparator unit 5 detects this and outputs a comparison result indicating that the DC output voltage Vo has fallen and reached the lower limit value VL1 of the reference voltage range to the control unit 6. The control unit 6 acquires this comparison result in the execution state of the first driving control and executes the second driving control, which sets the number k2 of converter units 4 to be driven at 1, in place of the first driving control, which sets the number k1 of converter units 4 to be driven at 0, from time t6. However, as described above, since the current outputted from one converter unit 4 is smaller than the current to be supplied to the load in the heavy load state, the current is insufficient as the current to be supplied to the load in the heavy load state. Since this insufficiency is covered by discharging of the output capacitor Co, the DC output voltage Vo falls further from the lower limit value VL1.

After this, at time t7 when the DC output voltage Vo that has fallen reaches the second voltage value VL2, the voltage comparator unit 5 detects this and outputs a comparison result indicating that the DC output voltage Vo has fallen and reached the second voltage value VL2 to the control unit 6. The control unit 6 acquires this comparison result in the execution state of the second driving control, increases the present number k2(=1) of converter units 4 being driven in the second driving control by the value k0(=1) to produce a new number k2(=2(=k2+k0)) and continues the second driving control with this new number k2. The control unit 6 also increases the present number k1(=0) of converter units 4 to be driven in the first driving control by the value k0(=1) to produce a new number k1(=1(=k1+k0)). When the continuation of the second driving control with the new number k2(=2) has started, the control unit 6 determines whether there is leeway for further increasing the number k2 (i.e., whether k2<n), and on determining that there is such leeway (i.e., that k2 is not n), executes the first determination process described above. Here in this example, since there is leeway for further increasing the number k2 (since the number k2 is 2 and is smaller than n=4), the control unit 6 executes the first determination process.

In the continued state of the second driving control that sets the number k2 of converter units 4 to be driven at 2, the total of the currents outputted by two converter units 4 is smaller than the current to be supplied to the load in the heavy load state, which means that this total current is insufficient as the current to be supplied to the heavy load state. Since this insufficiency is covered by discharging of the output capacitor Co, the DC output voltage Vo falls further from the second voltage value VL2. Here, in the first determination process, at a time when the certain period Td described above has passed (i.e., time t8), the control unit 6 acquires a comparison result indicating that the DC output voltage Vo is below the second voltage value VL2 from the voltage comparator unit 5. For this reason, the control unit 6 determines that in a continued state of the second driving control after a comparison result indicating that the DC output voltage Vo has fallen and reached the second voltage value VL2 was acquired, the state where the DC output voltage Vo is below the second voltage value VL2 has continued for the certain period Td.

By doing so, at time t8, the control unit 6 increases the present number k2(=2) of converter units 4 being driven in the second driving control by the value k0(=1) to produce a new number k2(=3(=k2+k0)), and continues the second driving control with this new number k2. The control unit 6 also increases the present number k1(=1) of converter units 4 to be driven in the first driving control by the value k0(=1) to produce a new number k1(=2(=k1+k0)). When the continuation of the second driving control with the new number k2(=3) has started, the control unit 6 determines whether there is leeway for further increasing the number k2 (i.e., whether k2<n), and on determining that there is leeway (i.e., that k2 does not equal n), executes a new first determination process. In this case, since there is leeway for further increasing the number k2 (the number k2 is three, which is lower than n=4), the control unit 6 executes the first determination process.

In the heavy load state, even in the continued state of the second driving control where the number k2 of converter units 4 to be driven is set at 3, the total of the currents outputted from the three converter units 4 is smaller than the current to be supplied to the load in the heavy load state, which means that the current is insufficient as the current to be supplied to the load in the heavy load state. Since this insufficiency is covered by discharging of the output capacitor Co, the DC output voltage Vo falls further from the voltage value at time t8. Here, in the first determination process, the control unit 6 acquires a comparison result indicating that the DC output voltage Vo is below the second voltage value VL2 from the voltage comparator unit 5 at a time when the certain period Td has passed again (i.e., at time t9). For this reason, the control unit 6 determines that in the continued state of the second driving control after the comparison result indicating that the DC output voltage Vo has fallen and reached the second voltage value VL2 was acquired, the state where the DC output voltage Vo is below the second voltage value VL2 has continued again for the certain period Td.

Accordingly, at time t9, the control unit 6 further increases the present number k2(=3) of converter units 4 being driven in the second driving control by the value k0(=1) to produce a new number k2(=4(=k2+k0)), and continues the second driving control with this new number k2. The control unit 6 also increases the present number k1(=2) of converter units 4 to be driven in the first driving control by the value k0(=1) to produce a new number k1(=3(=k1+k0)). When the continuation of the second driving control with the new number k2(=4) has started, the control unit 6 determines whether there is leeway for further increasing the number k2 (i.e., whether k2<n), and on determining that there is such leeway (i.e., that k2 does not equal n), executes the first determination process described above. Here in this example, since the number k2 is 4 and there is no leeway for further increasing the number k2, the control unit 6 does not execute the first determination process.

Here, since the total current outputted from the four converter units 4 is larger than the current to be supplied to the load in the heavy load state, the current is excessive as the current to be supplied to the load in the heavy load state. For this reason, the output capacitor Co is charged by the excessive part of the current, which causes the DC output voltage Vo to rise from the voltage value at time t9 (a voltage value that is below the second voltage value VL2).

After this, the DC output voltage Vo rises further after reaching the second voltage value VL2 and the lower limit value VL1 and at time t10 reaches the upper limit value VH1 of the reference voltage range. From time t10 onward, in the switching power supply device 1, the control unit 6 executes the steady-state operation in the heavy load state to control the DC output voltage Vo to be within the reference voltage range.

Figure 18:
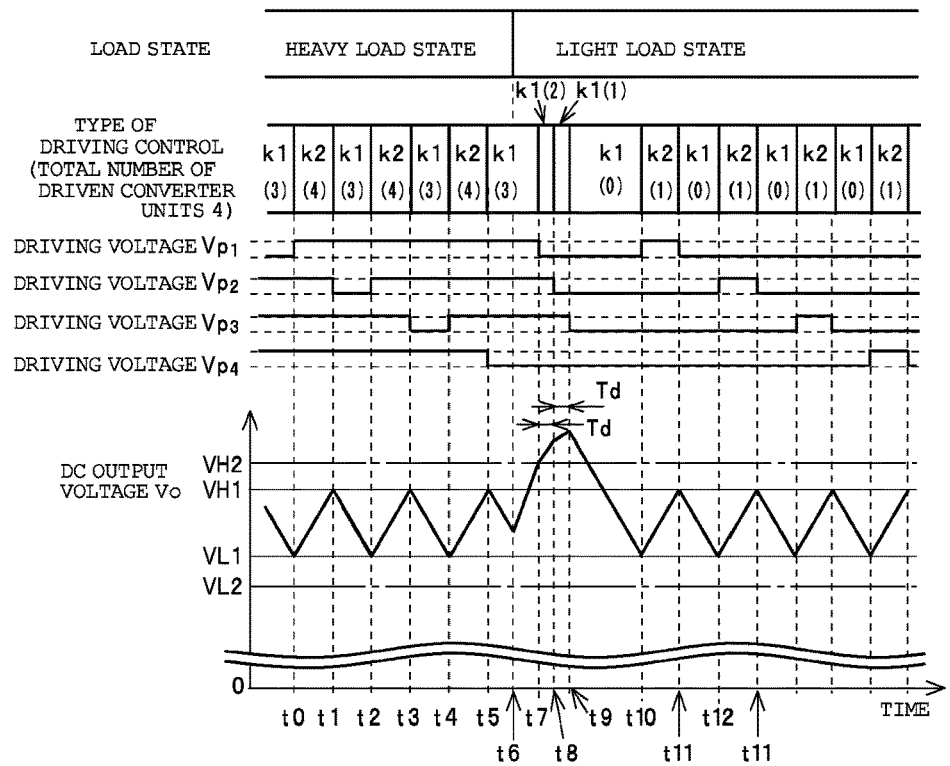
FIG. 18 is a diagram useful in explaining an operation of the switching power supply device 1 (where the number n of converter units 4 is 4) when there is a change from the heavy load state to the light load state.

As another example, as depicted in FIG. 18, when, at time t6 during execution of the first driving control in the steady-state operation in the heavy load state, the load changes to the light load state so as to skip the second medium load state and the first medium load state, the light load state is entered in a state where three converter units 4 are being driven, which means that the current is excessive as the current to be supplied to the load in the light load state. For this reason, the output capacitor Co is charged by the excessive part of the current, which causes the DC output voltage Vo to rise from the voltage value (a voltage that is above the lower limit value VL1 but is below the upper limit value VH1) at time t6.

After this, the DC output voltage Vo rises further after reaching the upper limit value VH1 of the reference voltage range and then when the DC output voltage Vo that has risen reaches the first voltage value VH2 at time t7, the voltage comparator unit 5 detects this and outputs a comparison result indicating that the DC output voltage Vo has risen and reached the first voltage value VH2 to the control unit 6. The control unit 6 acquires this comparison result in the execution state of the first driving control, decreases the present number k1(=3) of converter units 4 being driven in the first driving control by the value k0(=1) to produce a new number k1(=2(=k1-k0)), and continues the first driving control with this new number k1. The control unit 6 also decreases the present number k2(=4) of converter units 4 to be driven in the second driving control by the value k0(=1) to produce a new number k2(=3(=k2-k0)). When the continuation of the first driving control with the new number k1(=2) has started, the control unit 6 determines whether there is leeway for further decreasing the number k1 (i.e., whether k1 is not zero), and on determining that there is such leeway (i.e., that k1 is not zero), executes the second determination process described above. In this case, since there is leeway for further decreasing the number k1 (since the number k1 is 2 and is not zero), the control unit 6 executes the second determination process.

In the light load state, even in the continued state of the first driving control that sets the number k1 of the converter units 4 to be driven at 2, the total of the currents outputted from two converter units 4 is larger than the current to be supplied to the load in the light load state, which means that this current is excessive as the current to be supplied to the load in the light load state. Since the output capacitor Co is charged by the excessive part of the current, the DC output voltage Vo further increases from the first voltage value VH2. Here, in the second determination process described above, at a time when the certain period Td described above has passed (i.e., at time t8), the control unit 6 acquires a comparison result indicating that the DC output voltage Vo is above the first voltage value VH2 from the voltage comparator unit 5. For this reason, the control unit 6 determines that in the continued state of the first driving control after the comparison result indicating that the DC output voltage Vo has risen and reached the second voltage value VL2 was acquired, the state where the DC output voltage Vo is above the first voltage value VH2 has continued for the certain period Td.

By doing so, at time t8, the control unit 6 further decreases the present number k1(=2) of the converter units 4 being driven in the first driving control by the value k1(=2) to produce a new number k1(=1(=k1-k0)) and continues the first driving control with the new number k1. The control unit 6 also decreases the present number k2(=3) of converter units 4 to be driven in the second driving control by the value k0(=1) to produce a new number k2(=2(=k2-k0)). When the continuation of the first driving control with the new number k1(=1) has started, the control unit 6 determines whether there is leeway for further decreasing the number k1 (i.e., whether k1 is not zero), and on determining that there is such leeway (i.e., that k1 is not zero), executes the second determination process described above. Here in this example, since there is leeway for further decreasing the number k1 (since the number k1 is 1 and is not zero), the control unit 6 executes the second determination process.

In the light load state, even in the continued state of the first driving control that sets the number k1 of the converter units 4 to be driven at 1, the current outputted from one converter unit 4 is larger than the current to be supplied to the load in the light load state, which means that the current is excessive as the current to be supplied to the load in the light load state. Since the output capacitor Co is charged by the excessive part of the current, the DC output voltage Vo further increases from the voltage value at time t8. Here, in the second determination process described above, the control unit 6 acquires a comparison result indicating that the DC output voltage Vo is above the first voltage value VH2 when the certain period Td has passed again (i.e., at time t9). For this reason, the control unit 6 determines that in the continued state of the first driving control after the comparison result indicating that the DC output voltage Vo has risen and reached the first voltage value VH2 was acquired, the state where the DC output voltage Vo is above the first voltage value VH2 has continued again for the certain period Td.

Accordingly, at time t9, the control unit 6 further decreases the present number k1(=1) of converter units 4 being driven in the first driving control by the value k1(=2) to produce a new number k1(=0(=k1-k0)) and continues the first driving control with the new number k1. The control unit 6 also decreases the present number k2(=2) of converter units 4 to be driven in the second driving control by the value k0(=1) to produce a new number k2(=1(=k2-k0)). When the continuation of the first driving control with the new number k1(=0) has started, the control unit 6 determines whether there is leeway for further decreasing the number k1 (i.e., whether k1 is not zero), and on determining that there is such leeway (i.e., that k1 is not zero), executes the second determination process described above. In this case, since the number k1 is 0 and there is no leeway for further decreasing the number k1, the control unit 6 does not execute the second determination process.

In the continued state of the first driving control that sets the number k1 of the converter units 4 driven in the light load state, since all of the converter units 4 are in the stopped state and current is supplied to the load by discharging of the output capacitor Co, the DC output voltage Vo falls further from the voltage value at time t9.

After this, the DC output voltage Vo falls further after reaching the first voltage value VH2 and the upper limit value VH1 and reaches the lower limit value VL1 of the reference voltage range at time t10. From time t10 onward, in the switching power supply device 1, the control unit 6 executes the steady-state operation in the light load state to control the DC output voltage Vo to be within the reference voltage range.

Note that although an example where the load state changed during execution of the first driving control, since the same applies when the load state changes during execution of the second driving control, description thereof is omitted here. Also, in the operation of the switching power supply device 1 where the number of the converter units 4 is five or higher, even when the load state changes by four levels or more, the first determination process and the second determination process are repeated a plurality of times ((m−1) times when the load has changed by m levels) so that the number k1 of the converter units 4 driven in the first driving control and the number k2 of the converter units 4 driven in the second driving control are increased and decreased to numbers corresponding to the changed-to load state.

In this way, according to the switching power supply device 1 where the number n of converter units 4 is 4 or more, even when the load state has changed by three or more levels, the first determination process and the second determination process are repeated a plurality of times ((m−1) times when the load has changed by m levels), so that the number k1 of the converter units 4 driven in the first driving control and the number k2 of the converter units 4 driven in the second driving control are increased and decreased to numbers corresponding to the changed-to load state. This means that even after the load state changes, it is possible to execute steady-state operation in the changed-to load state to control the DC output voltage Vo to be within the reference voltage range.

Also, although the present embodiments described above use configurations where the control unit 6 generates and outputs the driving voltages Vp (i.e., voltage signals including a plurality of switching pulses with a fixed time ratio and fixed frequency that are set in advance) for burst driving of the converter units 4 so as to reliably satisfy zero volt switching conditions for the respective converter units 4 that are constructed as resonant converters, when the converter units 4 are not resonant converters, it is also possible to use a configuration that generates and outputs single switching pulses, which drive the respective converter units 4 in continuous on states, as the driving voltages Vp. Also, although the converter units 4 are constructed as resonant converters in the embodiments described above, the converter units 4 are not limited to this and may be non-resonant converters.

Expression 1

$$t_1 - t_0 = \frac{C\Delta V}{i_{41} - i_2} \quad (1)$$

Expression 2

$$t_2 - t_1 = \frac{C\Delta V}{i_2} \quad (2)$$

Expression 3

$$t_3 - t_2 = \frac{C\Delta V}{i_{42} - i_2} \quad (3)$$

Expression 4

$$t_4 - t_3 = \frac{C\Delta V}{i_2} \quad (4)$$

Expression 5

$$t_4 - t_0 = C\Delta V\left(\frac{1}{i_{42} - i_2} + \frac{1}{i_{42} - i_2} + \frac{2}{i_2}\right) \quad (5)$$
$$= \frac{1}{a(0.5 - a)} \frac{C\Delta V}{i_{MAX}}$$

Expression 6

$$f_1 = a(0.5 - a)\frac{i_{MAX}}{C\Delta V} \quad (6)$$

Expression 7

$$0 \le a \le 0.5 \quad (7)$$

Expression 8

$$t_1 - t_0 = \frac{C\Delta V}{i_{41} + i_{42} - i_2} \quad (8)$$

Expression 9

$$t_2 - t_1 = \frac{C\Delta V}{i_2 - i_{41}} \quad (9)$$

Expression 10

$$t_3 - t_2 = \frac{C\Delta V}{i_{41} + i_{42} - i_2} \quad (10)$$

Expression 11

$$t_4 - t_3 = \frac{C\Delta V}{i_2 - i_{42}} \quad (11)$$

Expression 12

$$t_4 - t_0 = C\Delta V\left(\frac{2}{i_{41} + i_{42} - i_2} + \frac{1}{i_2 - i_{41}} + \frac{1}{i_2 - i_{42}}\right) \quad (12)$$
$$= \frac{1}{(1-a)(a-0.5)} \frac{C\Delta V}{i_{MAX}}$$

Expression 13

$$f_2 = (a - 0.5)(1 - a)\frac{i_{MAX}}{C\Delta V} \quad (13)$$

Expression 14

$$0.5 < a \le 1 \quad (14)$$

Expression 15

$$t_1 - t_0 = \frac{C\Delta V}{i_{41} + i_{42} - i_2} \quad (15)$$

Expression 16

$$t_2 - t_1 = \frac{C\Delta V}{i_2} \quad (16)$$

Expression 17

$$t_2 - t_0 = C\Delta V\left(\frac{1}{i_{41} + i_{42} - i_2} + \frac{1}{i_2}\right) \quad (17)$$
$$= \frac{1}{a(1-a)} \frac{C\Delta V}{i_{MAX}}$$

Expression 18

$$f_0 = a(1-a)\frac{i_{MAX}}{C\Delta V} \quad (18)$$

Expression 19

$$f_1(\text{MAX}) = f_2(\text{MAX}) = 0.0625\frac{i_{MAX}}{C\Delta V} \quad (19)$$

Expression 20

$$f_0(\text{MAX}) = 0.25\frac{i_{MAX}}{C\Delta V} \quad (20)$$

Expression 21

$$f_k = \left(a - \frac{k-1}{n}\right)\left(\frac{k}{n} - a\right)\frac{i_{MAX}}{C\Delta V} \quad (21)$$

Expression 22

$$\frac{k-1}{n} \le a \le \frac{k}{n} \quad (22)$$

Expression 23

$$f_k(\text{MAX}) = \frac{1}{4n^2}\frac{i_{MAX}}{C\Delta V} \quad (23)$$

What is claimed is:

1. A switching power supply device comprising:
   n (where n is an integer of two or higher) converter units that are connected in parallel between a direct current (DC) input unit and a DC output unit; and
   a control unit that executes driving control over the n converter units,
   wherein the switching power supply device generates a DC output voltage based on a DC input voltage inputted from the DC input unit and outputs the DC output voltage from the DC output unit to a load, the switching power supply device further comprises a voltage comparator unit that compares the DC output voltage with a reference voltage range set in advance, a first voltage value that is higher than an upper limit value of the reference voltage range and a second voltage value that is lower than a lower limit value of the reference voltage range, and outputs a comparison result to the control unit, the control unit is configured to be capable of executing first driving control that drives k1 (where k1 is an integer set so that 0≤k1<n) converter units out of the n converter units and second driving control that drives k2 (where k2 is an integer set so that k1<k2≤n) converter units out of the n converter units, the control unit executes the first driving control when, in an execution state of the second driving control, the comparison result indicating that the DC output voltage has risen and reached the upper limit value of the reference voltage range has been acquired, the control unit executes the second driving control when, in an execution state of the first driving control, the comparison result indicating that the DC output voltage has fallen and reached the lower limit value of the reference voltage range has been acquired, the control unit decreases, when the comparison result indicating that the DC output voltage has risen and reached the first voltage value has been acquired in the execution state of the first driving control, k1 by a value k0 set in advance (where k0 is an integer that is one or greater but below k1) to produce a new k1 for the first driving control, continues the first driving control, and decreases k2 by the value k0 to produce a new k2 for the second driving control, and the control unit increases, when the comparison result indicating that the DC output voltage has fallen and reached the second voltage value has been acquired in the execution state of the second driving control, k2 by the value k0 to produce a new k2 for the second driving control, continues the second driving control, and increases k1 by the value k0 to produce a new k1 for the first driving control.

2. The switching power supply device according to claim 1, wherein n is an integer that is 3 or higher, and the control unit further decreases, when the comparison result indicating that the DC output voltage is above the first voltage value is continuously acquired for a certain period in a continued state of the first driving control after the comparison result indicating that the DC output voltage has risen and reached the first voltage value was acquired, k1 by the value k0 to produce a new k1 for the first driving control, continues the first driving control, and further decreases k2 by the value k0 to produce a new k2 for the second driving control, and the control unit further increases, when the comparison result indicating that the DC output voltage is below the second voltage value is continuously acquired for a certain period in a continued state of the second driving control after the comparison result indicating that the DC output voltage has fallen and reached the second voltage value was acquired, k2 by the value k0 to produce a new k2 for the second driving control, continues the second driving control, and further increases k1 by the value k0 to produce a new k1 for the first driving control.

3. The switching power supply device according to claim 1, wherein during a steady-state operation, in which the load is in a constant state and the first driving control executed when the comparison result indicating that the DC output voltage has risen and reached the upper limit value of the reference voltage range has been acquired in the execution state of the second driving control and the second driving control executed when the comparison result indicating that the DC output voltage has fallen and reached the lower limit value of the reference voltage range has been acquired in the execution state of the first driving control are repeated, the control unit drives the n converter units so as to balance utilization ratios of the n converter units.

4. The switching power supply device according to claim 2, wherein during a steady-state operation, in which the load is in a constant state and the first driving control executed when the comparison result indicating that the DC output voltage has risen and reached the upper limit value of the reference voltage range has been acquired in the execution state of the second driving control and the second driving control executed when the comparison result indicating that the DC output voltage has fallen and reached the lower limit value of the reference voltage range has been acquired in the execution state of the first driving control are repeated, the control unit drives the n converter units so as to balance utilization ratios of the n converter units.

5. The switching power supply device according to claim 1, wherein when executing the first driving control and the second driving control, the control unit drives the converter units by burst control.

6. The switching power supply device according to claim 2, wherein when executing the first driving control and the second driving control, the control unit drives the converter units by burst control.

7. The switching power supply device according to claim 3, wherein when executing the first driving control and the second driving control, the control unit drives the converter units by burst control.

8. The switching power supply device according to claim 4, wherein when executing the first driving control and the second driving control, the control unit drives the converter units by burst control.

* * * * *